（12） United States Patent
Yamamoto et al.

(10) Patent No.: US 9,151,882 B2
(45) Date of Patent: Oct. 6, 2015

(54) OPTICAL DISPLAY UNIT, AND SHEET MATERIAL AND ROLL FOR USE THEREIN

(75) Inventors: Shouji Yamamoto, Ibaraki (JP); Kentarou Takeda, Ibaraki (JP); Mitsuru Suzuki, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 0 days.

(21) Appl. No.: 13/403,482

(22) Filed: Feb. 23, 2012

(65) Prior Publication Data
US 2012/0148781 A1   Jun. 14, 2012

Related U.S. Application Data

(60) Division of application No. 12/745,428, which is a continuation of application No. PCT/JP2008/071890, filed on Dec. 2, 2008, now Pat. No. 8,313,605.

(30) Foreign Application Priority Data

Dec. 6, 2007 (JP) .................................. 2007-316268
Nov. 25, 2008 (JP) .................................. 2008-299776

(51) Int. Cl.
B32B 33/00 (2006.01)
G02B 5/30 (2006.01)
(Continued)

(52) U.S. Cl.
CPC .............. *G02B 5/3033* (2013.01); *B32B 7/06* (2013.01); *B32B 37/182* (2013.01); *G02B 1/105* (2013.01); *G02B 5/3083* (2013.01); *B32B 37/025* (2013.01);
(Continued)

(58) Field of Classification Search
CPC ...... B32B 7/06; B32B 37/182; B32B 37/025; B32B 38/0004; B32B 2457/20; G02B 5/3033; G02B 5/3083; G02B 1/105; G02F 2202/28; G02F 1/1303; G02F 1/13363; G02F 1/133528
See application file for complete search history.

(56) References Cited

U.S. PATENT DOCUMENTS

2003/0104156 A1   6/2003   Osada et al.
2005/0016670 A1   1/2005   Kanbara et al.
(Continued)

FOREIGN PATENT DOCUMENTS

JP     54-133150 A     10/1979
JP     2001-108830 A    4/2001
(Continued)

OTHER PUBLICATIONS

Japanese Office Action dated Nov. 15, 2011, issued in corresponding Japanese Patent Application No. 2007-268145, with English translation (9 pages).

(Continued)

Primary Examiner — Patricia L Nordmeyer
(74) Attorney, Agent, or Firm — Westerman, Hattori, Daniels & Adrian, LLP

(57) ABSTRACT

A material roll including a roll of a continuous sheet material, including an optical member including a polarizer and a release film provided on one side of the optical member with an adhesive interposed therebetween, wherein when no external force is applied, the continuous sheet material curls in the longitudinal direction in such a way that the release film is facing inward, and the continuous sheet material is for use in a process including bonding the optical member to a substrate with the adhesive interposed therebetween to form an optical display unit.

2 Claims, 20 Drawing Sheets

(51) Int. Cl.
  B32B 7/06 (2006.01)
  B32B 37/18 (2006.01)
  G02B 1/10 (2015.01)
  B32B 37/00 (2006.01)
  B32B 38/00 (2006.01)
  G02F 1/13 (2006.01)
  G02F 1/1335 (2006.01)
  G02F 1/13363 (2006.01)

(52) U.S. Cl.
  CPC ......... *B32B 38/0004* (2013.01); *B32B 2457/20* (2013.01); *G02F 1/1303* (2013.01); *G02F 1/13363* (2013.01); *G02F 1/133528* (2013.01); *G02F 2202/28* (2013.01); *Y10T 156/1082* (2015.01); *Y10T 156/1084* (2015.01); *Y10T 428/14* (2015.01); *Y10T 428/1476* (2015.01)

(56) References Cited

U.S. PATENT DOCUMENTS

| | | | |
|---|---|---|---|
| 2006/0124248 A1 | 6/2006 | Kanbara et al. | |
| 2007/0134459 A1* | 6/2007 | Hubert et al. | 428/40.1 |
| 2008/0199637 A1* | 8/2008 | Ushiyama et al. | 428/1.31 |
| 2009/0033833 A1 | 2/2009 | Aminaka | |
| 2009/0159175 A1 | 6/2009 | Nakahira et al. | |
| 2009/0218049 A1 | 9/2009 | Kanbara et al. | |
| 2010/0300611 A1 | 12/2010 | Yamamoto et al. | |

FOREIGN PATENT DOCUMENTS

| | | | |
|---|---|---|---|
| JP | 2002-019039 A | | 1/2002 |
| JP | 2002-365432 A | | 12/2002 |
| JP | 2003-165182 A | | 6/2003 |
| JP | 2005-037416 A | | 2/2005 |
| JP | 2005-309371 A | | 11/2005 |
| JP | 2005-326531 A | | 11/2005 |
| JP | 2005326531 A | * | 11/2005 |
| JP | 2007-079214 A | | 3/2007 |
| JP | 2007-114270 A | | 5/2007 |
| JP | 2007-140046 A | | 6/2007 |
| TW | 200632002 | | 11/1994 |
| WO | WO 2006001504 A1 | * | 1/2006 |

OTHER PUBLICATIONS

Japanese Office Action dated Mar. 23, 2012, issued in corresponding Japanese Patent Application No. 2008-299776, with English translation (9 pages).
Chinese Office Action dated Jul. 17, 2012, issued in corresponding Chinese Patent Application No. 200880116994.6, with English translation (8 pages).
US Notice of Allowance dated Aug. 31, 2012, issued in corresponding U.S. Appl. No. 12/745,428 (21 pages).
International Search Report of PCT/JP2008/071890, mailing date of Jan. 20, 2009.
Notification of Transmittal of Translation of the International Preliminary Report on Patentbility (Form PCT/IB/338) of International Application No. PCT/JP2008/071890 mailed Aug. 19, 2010 with Forms PCT/IB/373 and PCT/ISA/237.
Korean Office Action dated Jul. 29, 2011, issued in corresponding Korean Patent Application No. 10-2010-7012399.
Chinese Office Action dated Oct. 19, 2011, issued in corresponding Chinese Patent Application No. 200880116994.6.
Korean Office Action dated Nov. 9, 2011, issued in corresponding Korean Patent Application No. 10-2010-7012399.
Japanese Office Action dated May 30, 2012, issued in corresponding Japanese Patent Application No. 2008-299776.(4 pages).
Chinese Office Action dated Jul. 28, 2014, issued in corresponding Chinese Application No. 201210321487.4; w/ English translation. (15 pages).
Chinese Office Action dated Sep. 1, 2014, issued in corresponding Chinese Application No. 201310054082.3; w/English translation. (22 pages).
Office Action dated Dec. 24, 2014, issued in corresponding Taiwanese Application No. 101147780, w/English translation. (10 pages).
Office Action dated Apr. 24, 2015, issued in the corresponding Chinese Patent Application No. 201310054082.3, with English translation (14 pages).

* cited by examiner

Fig6
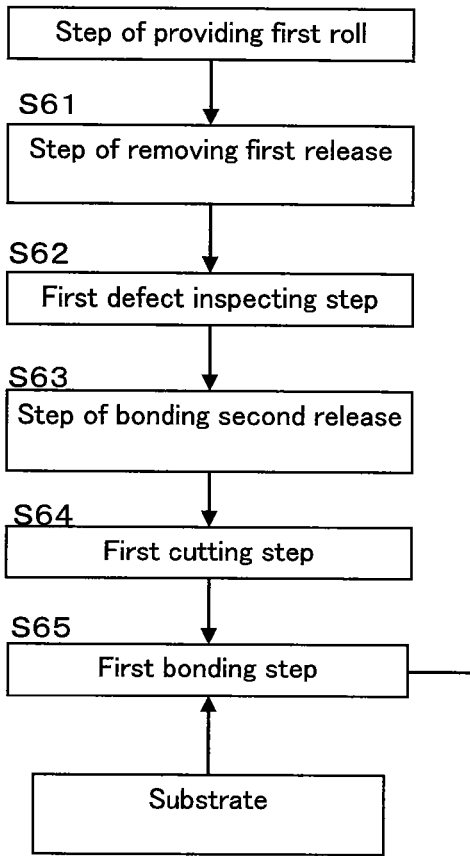
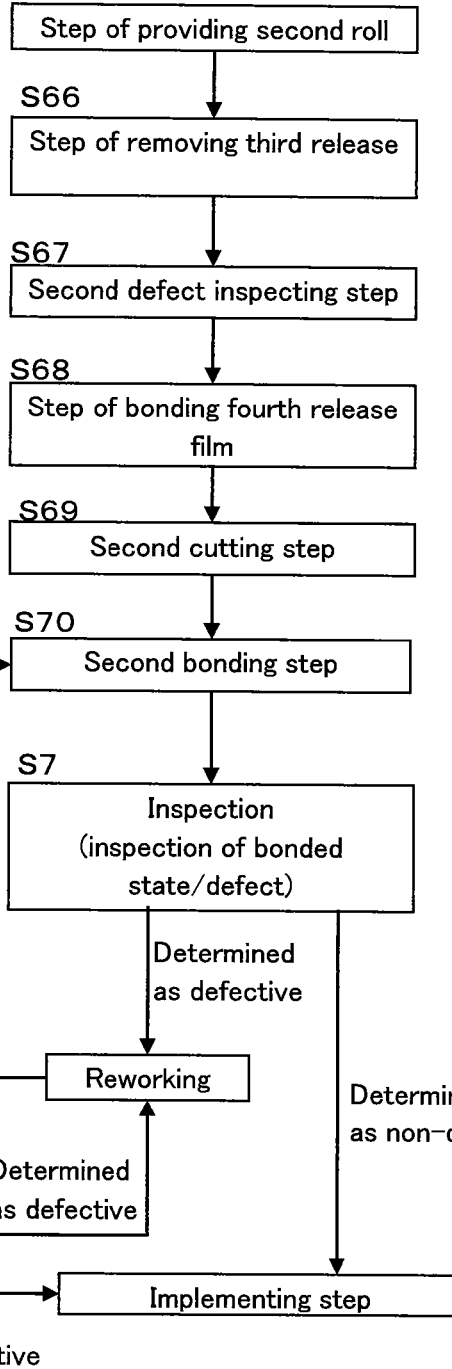

Fig18
Example of manufacturing process in optical film manufacturer
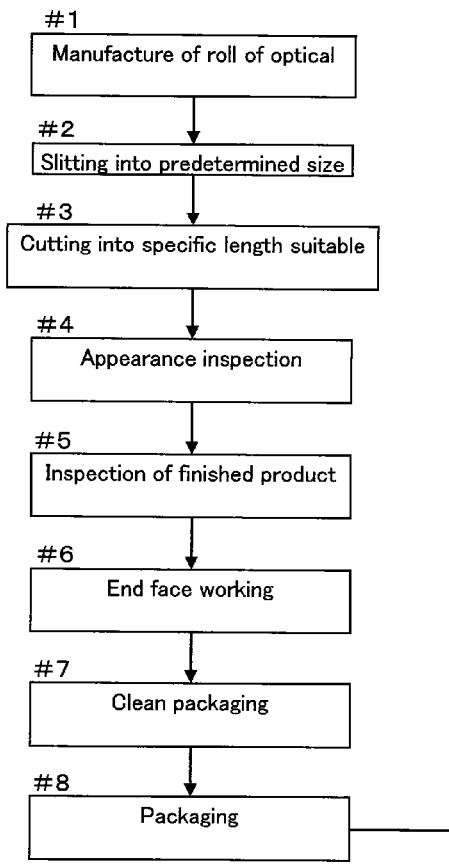
Example of manufacturing process in panel processing manufacturer
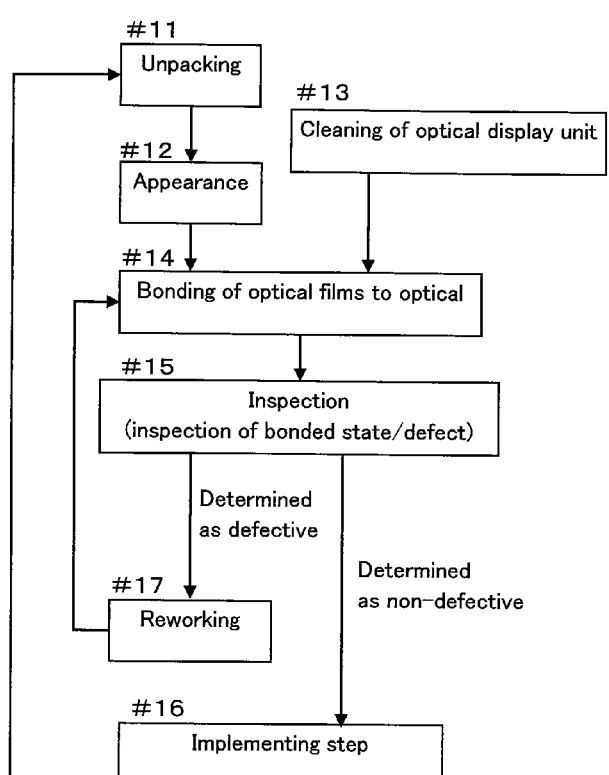

Fig.19
(a)
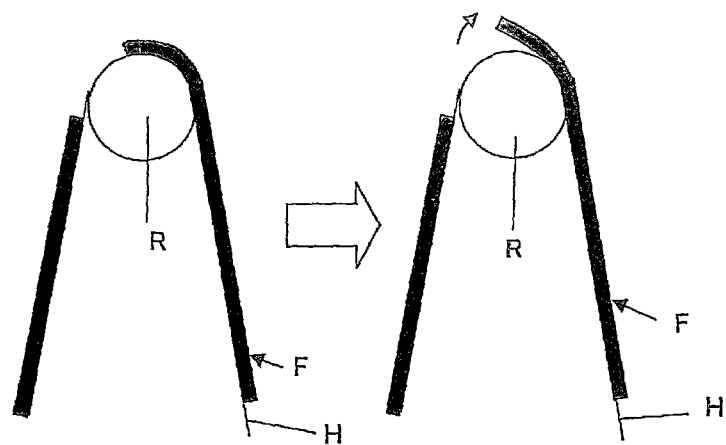
(b)
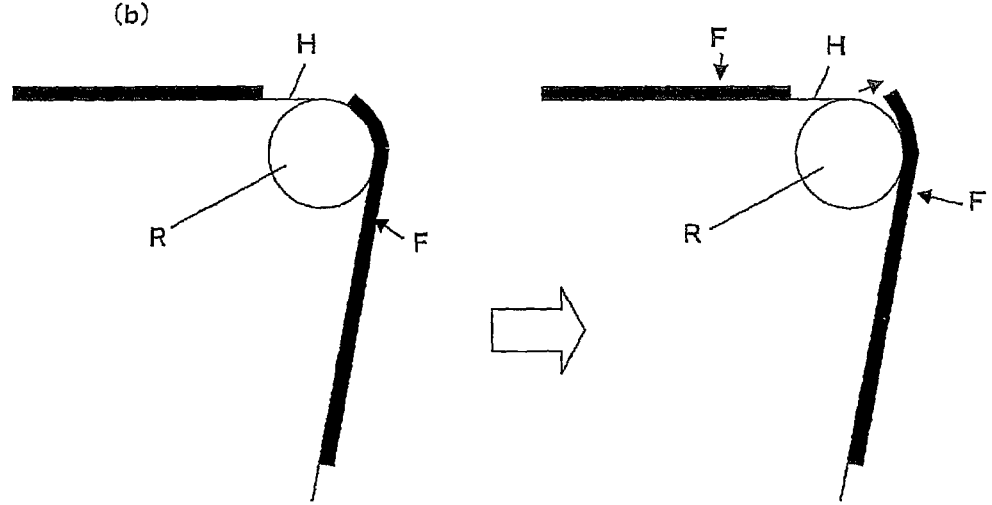

US 9,151,882 B2

OPTICAL DISPLAY UNIT, AND SHEET MATERIAL AND ROLL FOR USE THEREIN

CROSS-REFERENCE OF RELATED APPLICATIONS

This application is a Divisional of application Ser. No. 12/745,428, filed May 28, 2010, which is a 371 of International Application No. PCT/JP2008/071890 filed Dec. 2, 2008.

TECHNICAL FIELD

The invention relates to a method for manufacturing an optical display unit including a substrate and an optical member that includes a polarizer and is bonded to the substrate with an adhesive interposed therebetween. The invention also relates to a sheet material and a material roll thereof for use in the optical display unit manufacturing method.

BACKGROUND ART

FIG. 18 schematically shows a conventional method for manufacturing an optical display unit to be incorporated into a liquid crystal display device. First, an optical film manufacturer produces a continuous sheet material, which includes an optical member, in the form of a material roll (#1). Examples of the "continuous sheet material" include a raw polarizing plate, a raw laminated film of a polarizing plate and a retardation plate, and so on for use in the production of liquid crystal displays. The material roll is then slit into a predetermined size (a size according to the size of a substrate) (#2). The slit piece of the continuous material is then cut into a specific length according to the size of the substrate to be bonded (#3). The specific-length piece of the sheet material is then subjected to an appearance inspection (#4). The finished product is then inspected (#5). Subsequently, the four end faces of the piece of the sheet material are worked (#6). The working is performed to prevent the adhesive or the like from coming out of the end faces in transit. The piece of the sheet material is then subjected to clean packaging in a clean room environment (#7). Subsequently, packaging for transportation (transport packaging) is performed (#8). The piece of the sheet material manufactured as described above is transported to a panel processing manufacturer.

The panel processing manufacturer unpacks the piece of the material sheet transported (#11). An appearance inspection is then performed to check whether scratches, stains or other defects are produced in transit or during unpacking (#12). The piece of the sheet material determined as non-defective in the inspection is then transferred to the next step. This appearance inspection may be omitted in some cases. The substrate (such as a glass substrate with a sealed liquid crystal cell) to which the piece of the sheet material will be bonded is previously manufactured and cleaned before the bonding step (#13).

The piece of the sheet material and the substrate are bonded together to form an optical display unit (#14). The release film is peeled off from the piece of the sheet material so that the adhesive can be left, and one side of the substrate is bonded to the surface of the adhesive. The other side of the substrate may also be bonded in a similar manner. A bonded state inspection and a defect inspection are then performed (#15). The optical display unit determined as non-defective in the inspection is transferred to an implementing step and implemented into a liquid crystal display device (#16). On the other hand, the optical display unit determined as defective is subjected to a reworking process (#17). In the reworking process, the optical member is peeled off from the substrate. A new optical member is bonded to the reworked substrate (#14).

The manufacturing process described above particularly requires the steps of working the end faces, packaging the piece of the sheet material, and unpacking the material, because the optical film manufacturer and the panel processing manufacturer are located at different places. However, such a multi-step process has the problem of an increase in manufacturing cost. There are also problems in which scratches, dust, stains, and so on can be caused by the multi-step process or the transportation so that an inspection process can be necessary, and problems in which different types of sheet materials must be carried and managed.

Japanese Patent Application Laid-Open (JP-A) No. 2007-140046 (Patent Literature 1) discloses a method for solving the problems. According to the publication, a sheet material including an optical member is drawn from a roll thereof, and whether the sheet material has any defect is detected. Based on the result of the detection, the sheet material is cut into pieces. Subsequently, the release film is peeled off, and then the cut piece of the sheet material is bonded to a liquid crystal cell substrate. The above steps are arranged in a continuous manufacturing line. Therefore, a roll of the sheet material can be directly packaged and delivered, in contrast to the conventional method including stamping the sheet material into pieces, carefully packaging each piece of the sheet material after the stamping, and delivering it to a panel processing manufacturer. JP-A No. 2005-37416 (Patent Literature 2) proposes another continuous manufacturing method including cutting the members (e.g., a polarizing plate) of a sheet material other than a release film so that the sheet material can be kept continuous by means of the release film and bonding the cut piece of the sheet material to a substrate with the adhesive interposed therebetween, while peeling off the release film.

Patent Literature 1: Japanese Patent Application Laid-Open (JP-A) No. 2007-140046.
Patent Literature 2: Japanese Patent Application Laid-Open (JP-A) No. 2005-37416.

DISCLOSURE OF INVENTION

Problems to be Solved by the Invention

The continuous manufacturing method has a problem in which the other members peel from the release film in a certain feed route after the cutting, so that feed trouble or degradation of the accuracy of bonding to the substrate may occur. In particular, as shown in Parts (a) and (b) of FIG. 19, a peeling accident in which an edge of a member F peels from a release film H is more likely to occur, when the release film H and the member F of a cut piece of the sheet material are turned back at an angle of 90 to 180 degrees on a roller R. If the peeling member F is transported as it is, it may adhere to a surrounding to cause feed trouble. If the peeling member F is bonded to the substrate, a reduction in the bonding accuracy may occur. Hereinafter, a process including cutting the members of the sheet material other than the release film or the surface protecting member, while leaving the release film or the surface protecting member uncut may be called "half cutting," and a process including bonding a carrier film to the sheet material and cutting the sheet material while leaving the carrier film uncut may also be called "half cutting."

The invention has been made in view of the above circumstances, and an object of the invention is to provide an optical display unit manufacturing method that includes subjecting a sheet material having curling properties to half cutting and bonding the cut piece of the sheet material to a substrate with an adhesive interposed therebetween, while peeling off the member left uncut and can solve the problem of peeling of the cut piece of the sheet material during feeding after the half cutting in such a process, so that the cut piece of the sheet material can be bonded to the substrate in a satisfactory manner. Another object of the invention is to provide a sheet material and a roll thereof for use in such an optical display unit manufacturing method.

Means for Solving the Problems

As a result of investigations to solve the above problems, the invention described below has been accomplished.

The invention is directed to a continuous sheet material, including:

an optical member including a polarizer; and a release film provided on one side of the optical member with an adhesive interposed therebetween, wherein when no external force is applied, the continuous sheet material curls in the continuous itudinal direction in such a way that the release film is facing inward, and the continuous sheet material is for use in a process including bonding the optical member to a substrate with the adhesive interposed therebetween to form an optical display unit.

This feature is effective and advantageous as described below. The continuous sheet material is suitable for use in a process including bonding the optical member including a polarizer to a substrate with the adhesive interposed therebetween to form an optical display unit. The sheet material includes at least the optical member and the release film provided on one side of the optical member with the adhesive interposed therebetween. The sheet material may further include, as a component, a surface protecting member provided on the opposite side from the release film side. When no external force is applied, the sheet material curls in the longitudinal direction in such a way that the release film is facing inward. The term "external force" typically means a tensile force, a pressure, or any other external force other than gravity. Since the sheet material is formed in such a way that the release film can curl inward, the member having undergone half cutting is well prevented from peeling from the release film. Therefore, for example, when placed on the roller R as shown in FIG. 19, the member having undergone half cutting is well prevented from the peeling phenomenon in which the member peels from the release film, so that the accuracy of bonding of the member to the substrate is improved. The method for manufacturing the optical display unit is described in detail below. The curling properties of the sheet material are caused by part or all of the factors derived from the components of the sheet material. For example, the curling properties may be caused by a structure composed of the polarizer, which forms the optical member, and a film member provided on at least one side of the polarizer. In an embodiment of the invention, the state of "curling" is intended to include not only a state in which the curling surface has the same radius of curvature but also a state in which the curling surface has portions with different radii of curvature.

In an embodiment of the invention, a cut sample of the sheet material preferably has a curling amount of 5 mm to 100 mm, when it is placed on a flat surface so that it can curl to become convex downwardly, wherein the sample is obtained by cutting the sheet material in a length of 29.7 cm parallel to the longitudinal direction and in a width of 21.0 cm perpendicular to the longitudinal direction, and the curling amount is the height of an edge of the sample from the flat surface. The curling amount is preferably from 10 mm to 80 mm.

The curling amount may be evaluated by the curling amount measuring method described below. As shown in FIGS. 13 and 14, the continuous sheet material composed of various components is fed and cut in a size of 29.7 cm (parallel to the feeding direction (longitudinal direction: MD)) and in a size of 21.0 cm (parallel to the direction (transverse direction: TD) perpendicular to the feeding direction), so that the sample to be used is obtained. The measurement is performed in an environment at a temperature of 23° C. and a humidity of 55% RH. The sample is allowed to stand for about 10 seconds, and the curling direction is confirmed. After the curling direction is confirmed, the sample is placed, as shown in FIG. 13, on a flat surface plate so that it can curl to become convex downwardly when viewed from the side. After 10 minutes, the height (h) of an upper edge of the curling sample from the upper surface of the flat surface plate is measured. The height (h) is used as the amount of curling. The measurement is performed by visual observation using a stainless steel ruler (or a digital vernier caliper). The state in which the sheet material curls so that the release film is facing inward is named "minus curling." On the other hand, the state in which the sheet material curls so that the release film is facing outward is named "plus curling." FIG. 14 shows an example of the structure of the sample subjected to the measurement of the amount of curling. The example of the sheet material of the invention curls in the longitudinal direction so that the release film is facing inward (a minus curling sheet material). Another sheet material curls so that the release film is facing outward (a plus curling sheet material). In FIG. 14, the stretched PVA has the specifications shown in Table 1. TAC2 is TD-80UL manufactured by Fujifilm Corporation. PET (polyethylene terephthalate) is manufactured by Mitsubishi Polyester Film Corporation. The surface protecting film (an example of the surface protecting member) is a polyethylene terephthalate film with a thickness of 38 µm. The adhesive on the surface protecting film side is an acrylic adhesive with a layer thickness of about 20 µm. The release film is a polyethylene terephthalate film with a thickness of 25 µm.

When the amount of curling is 5 mm or more in the minus curling direction, the process of feeding the sheet material having undergone half cutting can be free from a problem such as peeling of the cut piece of the sheet material member (e.g., the optical member) from the release film. If the amount of curling is more than 100 mm in the minus curling direction, the accuracy of bonding of the cut piece of the sheet material member to the substrate may be undesirably reduced.

The optical member is not restricted, and examples thereof include various combinations of components as described below.

In an embodiment of the invention, the sheet material may be wound so that the release film is placed inside.

When the sheet material is wound so that the release film is placed inside according to this feature, the sheet material is caused to have a curling habit, so that the sheet material with no external force applied thereto curls with the release film facing inward. According to the invention, peeling of the cut piece of the member during feeding and the problem with the accuracy of bonding to the substrate are prevented.

In an embodiment of the invention, the optical member may include a first film provided on one side of the polarizer, a second film provided on the other side of the polarizer, and an adhesive provided on the second film, wherein the release film is provided on the second film with the adhesive interposed therebetween, and the longitudinal dimensional change rate of the first film is lower than the longitudinal dimensional change rate of the second film.

According to this feature, the optical member includes the polarizer, the first and second films provided on both sides of the polarizer and having different longitudinal dimensional change rates, and the adhesive provided on the second film. For example, the first and second films may each form a polarizer protecting film. The release film is provided on the second film with the adhesive interposed therebetween. The effect of the dimensional changes of the polarizer itself and the first and second films having different dimensional change rates allows the optical member itself to curl, so that the sheet material curls with the release film facing inward. In some cases, the curling properties of the whole of the sheet material may be influenced by not only the properties of the optical member but also the properties of the release film or any other member.

A method for measuring the "dimensional change rate (%, at 70° C.)" is described below. For the measurement of the dimensional change rate in the longitudinal direction (feed direction), a sample strip is prepared that is 10 mm long in the feed direction (MD) and 3 mm long in a direction perpendicular thereto. For the measurement of the dimensional change rate in the direction perpendicular to the feed direction, a sample strip is prepared that is 10 mm long in the direction perpendicular to the feed direction (also referred to as TD) and 3 mm long in the feed direction (MD). The dimensional change rate is measured at 70° C. using TMA/SS6100 manufactured by Seiko Instruments Inc. The measurement conditions are as follows. The sample strip is cooled at a rate of 10° C./minute from room temperature to −50° C. and then held at −50° C. for 30 minutes. Subsequently, the sample strip is heated at a rate of 10° C./minute to 100° C. and then held at 100° C. for 30 minutes. Three cycles of this process are performed. After the three cycles, the dimensional change rate is determined using TMA/SS6100. After two cycles of the process, the resulting data is used to evaluate the dimensional change rate. The evaluation is calculated by dividing the amount of dimensional change at 70° C. by 10,000 and multiplying the result by 100 ({(the amount of dimensional change at 70° C.)/10,000}×100).

In another embodiment of the invention, the continuous sheet material may be wound into a roll. The material roll is preferably used in a method for manufacturing an optical display unit as described below.

The invention is also directed to a method for manufacturing an optical display unit including a substrate and an optical member that includes a polarizer and is bonded to the substrate with an adhesive interposed therebetween, which includes:

a cutting step including feeding a continuous sheet material from a roll of the continuous sheet material, wherein the continuous sheet material includes the optical member and a release film provided on one side of the optical member with the adhesive interposed therebetween, and cutting the sheet material by cutting means, while leaving the release film uncut; and a bonding step including bonding the sheet material to the substrate with the adhesive interposed therebetween, while removing the release film, wherein when no external force is applied, the sheet material curls in the longitudinal direction so that the release film is facing inward.

This feature is effective and advantageous as described below. First, the continuous sheet material is provided in the form of a roll. The sheet material includes at least an optical member and a release film and typically further includes a peelable surface protecting member provided on the surface of the optical member.

The optical member may include at least a polarizer and a polarizer protecting film. Examples of the polarizer protecting film include a cellulose-based film, an acrylic film, a polyester-based film, a norbornene-based film, and a cycloolefin-based film. The polarizer protecting film may have undergone any of various surface treatments. Examples of various surface treatments include hard coating treatments, antireflection treatments, and treatments for any other purpose such as anti-sticking, diffusion or antiglare purposes. The release film is provided on the optical member with the adhesive interposed therebetween.

When no external force is applied, the sheet material curls in the longitudinal direction so that the release film is facing inward. When the main component of the sheet material is the optical member and when the other members (such as the release film) are considered to have substantially no effect, factors for the curling properties are derived from the optical member.

Hereinafter, the direction of the feeding and transporting of the sheet material from the roll (feed direction) is also referred to as MD, and the direction perpendicular to the feed direction is also referred to as TD.

The sheet material is fed from the roll and cut by cutting means, while the release film is left uncut (cutting step). In this step, while leaving the release film uncut, the other members of the sheet material are cut into a piece or pieces. For example, when the sheet material is a laminate of a surface protecting member, an optical member, an adhesive, and a release film, the members other than the release film, namely, the surface protecting member, the optical member and the adhesive are cut.

Thereafter, as shown in FIG. 19, the cut piece composed of the members of the sheet material other than the release film may be turned back along the feeding line. Even in such a case, the sheet material curls with the release film facing inward, so that the other members are prevented from peeling from the cut portion.

After the cutting step, the cut piece of the sheet material is bonded to the substrate with the adhesive interposed therebetween, while the release film is removed (bonding step). Since the sheet material is bonded to the substrate while peeling off the release film, the optical member as a component of the sheet material can be bonded to the substrate while inhibiting the sheet material from curling. Examples of the substrate include a liquid crystal cell glass substrate, an organic EL emitting material substrate, and so on. In a preferred mode, the substrate is previously subjected to a cleaning treatment before the bonding.

According to the feature of the invention, the sheet material has the curling properties, and therefore, even when the other members of the sheet material are cut with the release film left uncut, the cut members are prevented from peeling from the release film during the subsequent feeding, so that the cut members can be bonded to the substrate with high accuracy.

The method for manufacturing the optical display unit, which includes bonding a sheet material (hereinafter also referred to as a first sheet material) to one side of the substrate, may also include bonding a sheet material (hereinafter also referred to as a second sheet material) to the other side in the same manner.

In an embodiment of the invention, a cut sample of the sheet material may have a curling amount of 5 mm to 100 mm, when it is placed on a flat surface so that it can curl to become convex downwardly, wherein the sample is obtained by cutting the sheet material in a length of 29.7 cm parallel to the longitudinal direction and in a width of 21.0 cm perpendicular to the longitudinal direction, and the curling amount is the height of an edge of the sample from the flat surface. In view of bonding accuracy, the curling amount is preferably 80 mm or less. In order to prevent peeling more reliably, the curling amount is more preferably 10 mm or more. This feature is effective and advantageous as described above.

In an embodiment of the invention, the sheet material may be wound into a roll so that the release film of the sheet material can be placed inside. This feature is also effective and advantageous as described above.

In an embodiment of the invention, the optical member may include a first film provided on one side of the polarizer, a second film provided on the other side of the polarizer, and an adhesive provided on the second film, wherein
the release film is provided on the second film with the adhesive interposed therebetween, and
the longitudinal dimensional change rate of the first film is lower than the longitudinal dimensional change rate of the second film. This feature is effective and advantageous as described above.

In an embodiment of the invention, the method for manufacturing an optical display unit may further include:
a release film removing step including feeding the sheet material from the roll and removing the release film;
a defect inspecting step including performing defect inspection after the release film removing step; and
a release film bonding step including bonding a release film to the sheet material with the adhesive interposed therebetween, after the defect inspecting step, wherein
in the cutting step, the sheet material is cut into a predetermined size without cutting the newly bonded release film. The defect inspection can be performed on the sheet material without the need to take into account the inherent retardation of the release film and defects in the release film, such as foreign matter or scratches deposited on or present in the release film. The release film to be newly bonded may be a new one or a used one. When the release film is a used one, it is preferably checked in advance to be sure that it does not have any problem such as foreign matter, stain, or breakage, before use.

The sheet material also has curling properties. For example, the curling properties may be caused by a difference between the components of the optical member (e.g., a difference in thickness, type, dimensional change rate, or the like), by the conditions of the manufacture of the optical film, or by the adhesive used to bond the members together. The tendency to curl along the longitudinal direction may be enhanced by winding the continuous sheet material into a roll.

Another embodiment of the invention is directed to a method for manufacturing an optical display unit including a substrate and an optical member that includes a polarizer and is bonded to the substrate with an adhesive interposed therebetween, which includes:
a carrier film bonding step including feeding a continuous sheet material from a roll of the continuous sheet material, wherein the continuous sheet material includes the optical member and a release film provided on one side of the optical member with the adhesive interposed therebetween, and bonding a carrier film to an opposite side of the sheet material from the release film side;
a cutting step including cutting the sheet material by cutting means, while leaving the carrier film uncut; and
a bonding step including peeling off the release film from the sheet material by peeling means and bonding the sheet material to the substrate with the adhesive interposed therebetween, while peeling off the carrier film, wherein
when no external force is applied, the sheet material curls in the longitudinal direction so that the release film is facing outward.

This feature is effective and advantageous as described below. The continuous sheet material is provided in the form of a roll. The sheet material includes at least an optical member and a release film and typically further includes a peelable surface protecting member provided on the surface of the optical member. The optical member may include at least a polarizer and a polarizer protecting film. When the main component of the sheet material is the optical member and when the other members (such as the release film) are considered to have substantially no effect, factors for the curling properties are derived from the optical member. The release film is provided on the optical member with the adhesive interposed therebetween. When no external force is applied, the sheet material curls in the longitudinal direction so that the release film is facing outward. For example, the continuous sheet material may be wound into a roll so that the release film can be placed outside. The method for measuring the curling is as described above.

Subsequently, the sheet material is fed from the roll, and the carrier film is bonded to the opposite side of the sheet material from the release film side with the adhesive interposed therebetween (carrier film bonding step). The sheet material is then cut using cutting means, while the carrier film and the adhesive are left uncut (cutting step). Thus, the sheet material is cut with the carrier film and the adhesive left uncut.

After the cutting step, the release film is peeled off from the sheet material by peeling means, and the sheet material is bonded to the substrate with the adhesive interposed therebetween, while the carrier film and the adhesive are peeled off (bonding step). Since the sheet material is bonded to the substrate while peeling off the carrier film and the adhesive, the optical member as a component of the sheet material can be bonded to the substrate while inhibiting the sheet material from curling.

The sheet material curls so that the release film is facing outward, and therefore, it curls so that the carrier film is facing inward. Thus, when the sheet material is cut with the carrier film left uncut, peeling of the sheet material from the carrier film is well suppressed during feeding. For example, on a roller R as shown in FIG. 19, therefore, peeling of the cut piece of the sheet material from the carrier film can be well suppressed, so that the cut piece can be bonded to the substrate with high accuracy. According to the feature of the invention, the sheet material has the curling properties, and therefore, even when the sheet material is cut with the carrier film left uncut, the cut piece of the sheet material is prevented from peeling from the carrier film during the subsequent feeding, so that the sheet material can be bonded to the substrate with high accuracy.

In an embodiment of the invention, the amount of curling in the longitudinal direction in such a manner that the release film is facing outward is preferably from 5 mm to 100 mm. This means that the material curls in the plus curling direction.

A further embodiment of the invention is also directed to a method for manufacturing an optical display unit including a substrate and an optical member that includes a polarizer and is bonded to the substrate with an adhesive interposed therebetween, which includes:
a cutting step including feeding a continuous sheet material from a roll of the continuous sheet material, wherein the continuous sheet material includes the optical member, a release film provided on one side of the optical member with the adhesive interposed therebetween, and a surface protecting member provided on the opposite side of the optical member from the release film side, and cutting the sheet material by cutting means, while leaving the surface protecting member uncut;

a bonding step including peeling off the release film from the sheet material by peeling means and bonding the sheet material to the substrate with the adhesive interposed therebetween; and a cutting step including cutting the surface protecting member, wherein when no external force is applied, the sheet material curls in the longitudinal direction so that the release film is facing outward.

This feature is effective and advantageous as described below. First, the continuous sheet material is provided in the form of a roll. The sheet material includes at least an optical member, a release film and a surface protecting member provided on the opposite side from the release film side. The surface protecting member may be provided with or without an adhesive. The optical member may include at least a polarizer and a polarizer protecting film. When no external force is applied, the sheet material curls in the longitudinal direction so that the release film is facing outward. When no external force is applied, therefore, the sheet material curls so that the surface protecting member is facing inward. When the main component of the sheet material is the optical member and when the other members are considered to have substantially no effect, factors for the curling properties are derived from the optical member. The release film is provided on the optical member with the adhesive interposed therebetween. For example, the continuous sheet material may be wound into a roll so that the release film can be placed outside.

The first sheet material is fed from the roll, and while the surface protecting member is left uncut, the other members of the sheet material are cut by cutting means (cutting step). When the surface protecting member is provided on the optical member with an adhesive interposed therebetween, the members other than the surface protecting member and the adhesive may be cut. In this cutting step, the cut piece composed of the other members of the sheet material is formed on the surface protecting member, so that curling of the optical member or the whole of the sheet material can be suppressed.

After the cutting step, the release film is peeled off from the sheet material by peeling means. The cut piece composed of the other member of the sheet material is then bonded to the substrate with the adhesive interposed therebetween (bonding step). Subsequently, the surface protecting member is cut (cutting step).

The sheet material curls so that the release film is facing outward, and therefore, it curls so that the surface protecting member is facing inward. Thus, when the sheet material is cut with the surface protecting member left uncut, peeling of the other members of the sheet material from the surface protecting member is well suppressed. For example, on a roller R as shown in FIG. 19, therefore, peeling of the cut piece (composed of the other members of the sheet material) from the surface protecting film can be well suppressed, so that the cut piece can be bonded to the substrate with high accuracy. According to the feature of the invention, the sheet material has the curling properties, and therefore, even when the sheet material is cut with the surface protecting member left uncut, the cut piece composed of the other members of the sheet material is prevented from peeling from the surface protecting member during the subsequent feeding, so that the sheet material can be bonded to the substrate with high accuracy.

In an embodiment of the invention, the amount of curling in the longitudinal direction in such a manner that the release film is facing outward is preferably from 5 mm to 100 mm. This means that the material curls in the plus curling direction.

In an embodiment of the invention, the optical display unit preferably has a diagonal size in the range of 14 to 120 inches. This is because the larger the size, the more the optical member curls. The invention is also effective for an optical member with high curling properties, even though the optical member has a size of less than 14 inches. Optical display units generally used have a size of 82 inches or less.

BRIEF DESCRIPTION OF DRAWINGS

FIG. 6 is a flow chart of the method of Embodiment 3 for manufacturing an optical display unit;

FIG. 18 is a flow chart of a conventional method for manufacturing an optical display unit; and FIG. 19 is a diagram for illustrating peeling of a sheet material during feeding.

DESCRIPTION OF REFERENCE CHARACTERS

Figure 1:
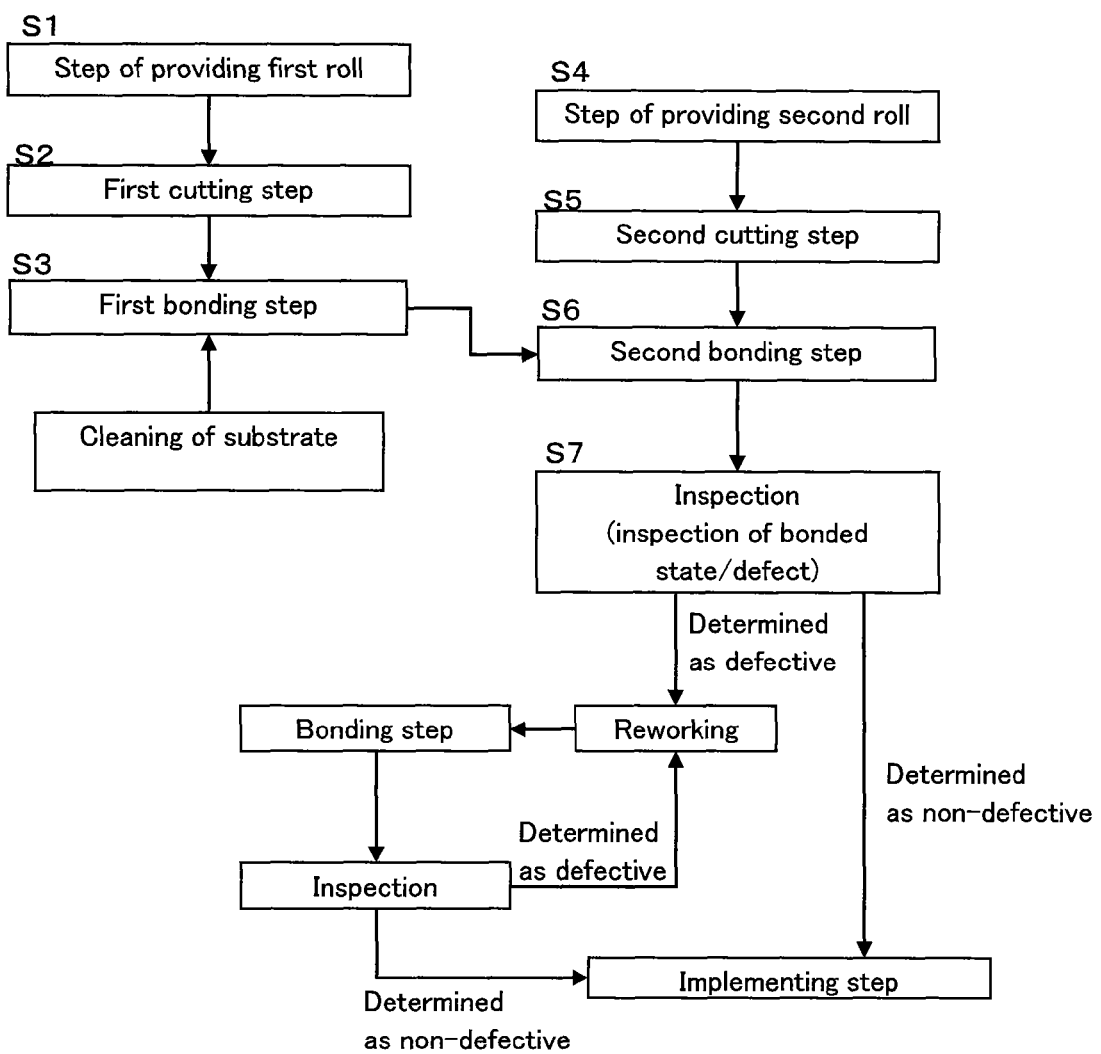
FIG. 1 is a flow chart of the method of Embodiment 1 for manufacturing an optical display unit.

In the drawings, reference character 1 represents a first sheet material, 2 a second sheet material, 11 a first optical member, 11a a polarizer, 11b a first film, 12 a first release film, 13 a protective film, 14 a first adhesive, 21a second optical member, 21a a polarizer, 21b a second film, 22 a second release film, 23 a protective film, 24 a second adhesive, and A a substrate.

BEST MODE FOR CARRYING OUT THE INVENTION

Embodiment 1

Figure 2:
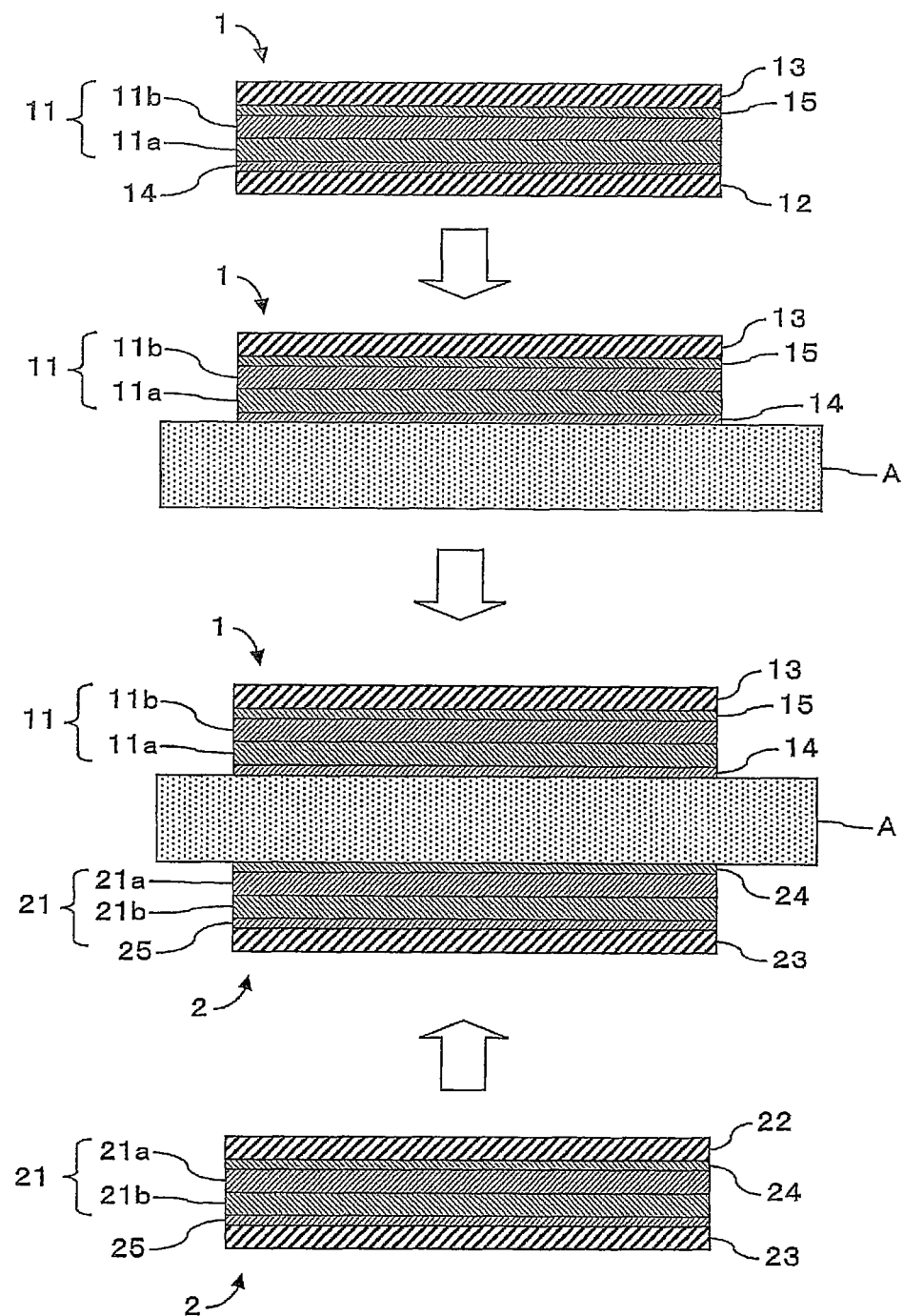
FIG. 2 is a schematic diagram for illustrating an optical member in Embodiment 1.

Embodiment 1 of the invention is described below. FIG. 1 shows a flow chart of the method of Embodiment 1 for manufacturing an optical display unit. FIG. 2 shows a schematic diagram of the structure of first and second optical members for use in Embodiment 1 and the structure of a laminate of the optical members and a substrate. In Embodiments 1 to 4 described below, first and second sheet materials each curl so that the release film is facing inward.

(1) Step of Providing First Material Roll (S1 in FIG. 1). A first roll of a first continuous sheet material is provided. As shown in FIG. 2, the laminated structure of the first sheet material 1 includes a first optical member 11, a first release film 12 and a surface protecting film 13. The first optical member 11 includes a first polarizer 11a and a first film 11b provided on one side thereof with a bonding adhesive layer (not shown) interposed therebetween. The feed-direction elastic modulus of the first polarizer 11a differs from that of the first film 11b. The first sheet material 1 curls in the longitudinal direction so that the first release film 12 is facing inward. The first film 11b is a polarizer protecting film (e.g., a triacetylcellulose film). The first film 11b may have undergone a surface treatment. The elastic modulus in the feed direction (feed-direction elastic modulus) can be changed by the surface treatment. Examples of the surface treatment include a hard coating treatment, an antireflection treatment, and a treatment for any other purpose such as anti-sticking, diffusion or antiglare purpose. The first release film 12 is provided on the first polarizer 11a with a first adhesive 14 interposed therebetween. The surface protecting film 13 is provided on the first film 11b with an adhesive 15 interposed therebetween.

A method for measuring the "elastic modulus" is described below. The "elastic modulus" corresponds to tensile elastic modulus. A sample strip having a width of 10 mm and a sufficient length in the measurement direction is obtained by cutting and subjected to a measurement with a tension tester (Tensilon) under a temperature environment at 25° C. and the conditions described below. The tensile elastic modulus is determined from the resulting S-S (Strain-Strength) curve. When the feed-direction elastic modulus (also referred to as "MD elastic modulus") is measured, the sample strip obtained by cutting is 10 mm wide in the direction perpendicular to the feed direction and, for example, 100 mm long in the feed direction. When the elastic modulus in the direction perpendicular to the feed direction (also referred to as "TD elastic modulus") is measured, the sample strip obtained by cutting is 10 mm wide in the feed direction and, for example, 100 mm long in the direction perpendicular to the feed direction.

Figure 12:
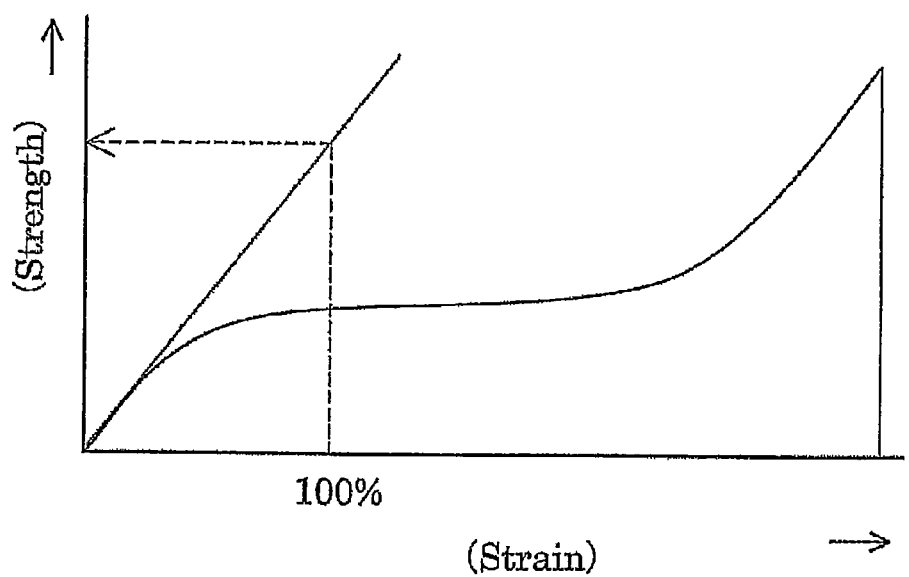
FIG. 12 is a diagram for illustrating a method for measuring elastic moduli.
Figure 13:
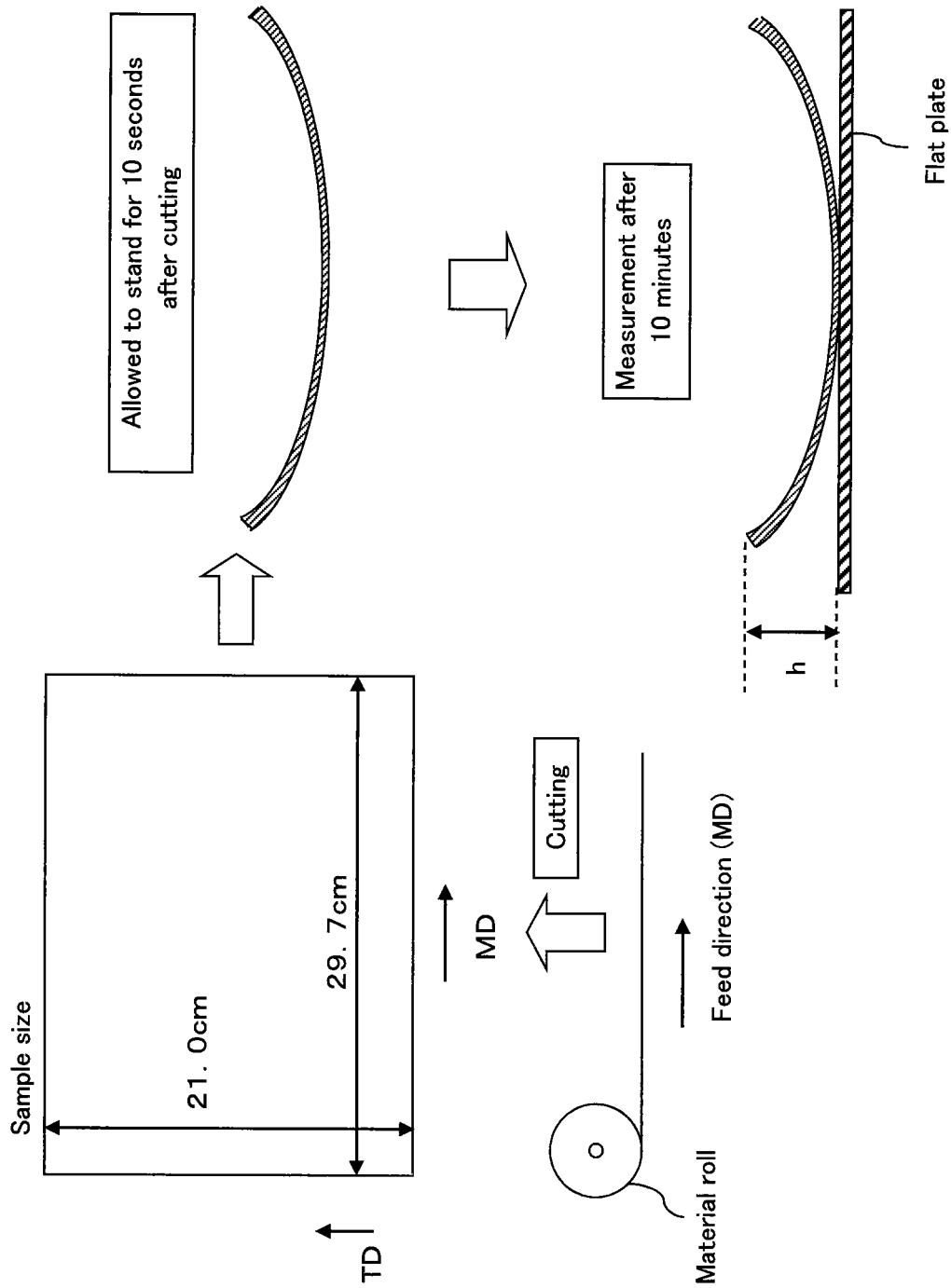
FIG. 13 is a diagram for illustrating a method for measuring the amount of curling.
Figure 14:
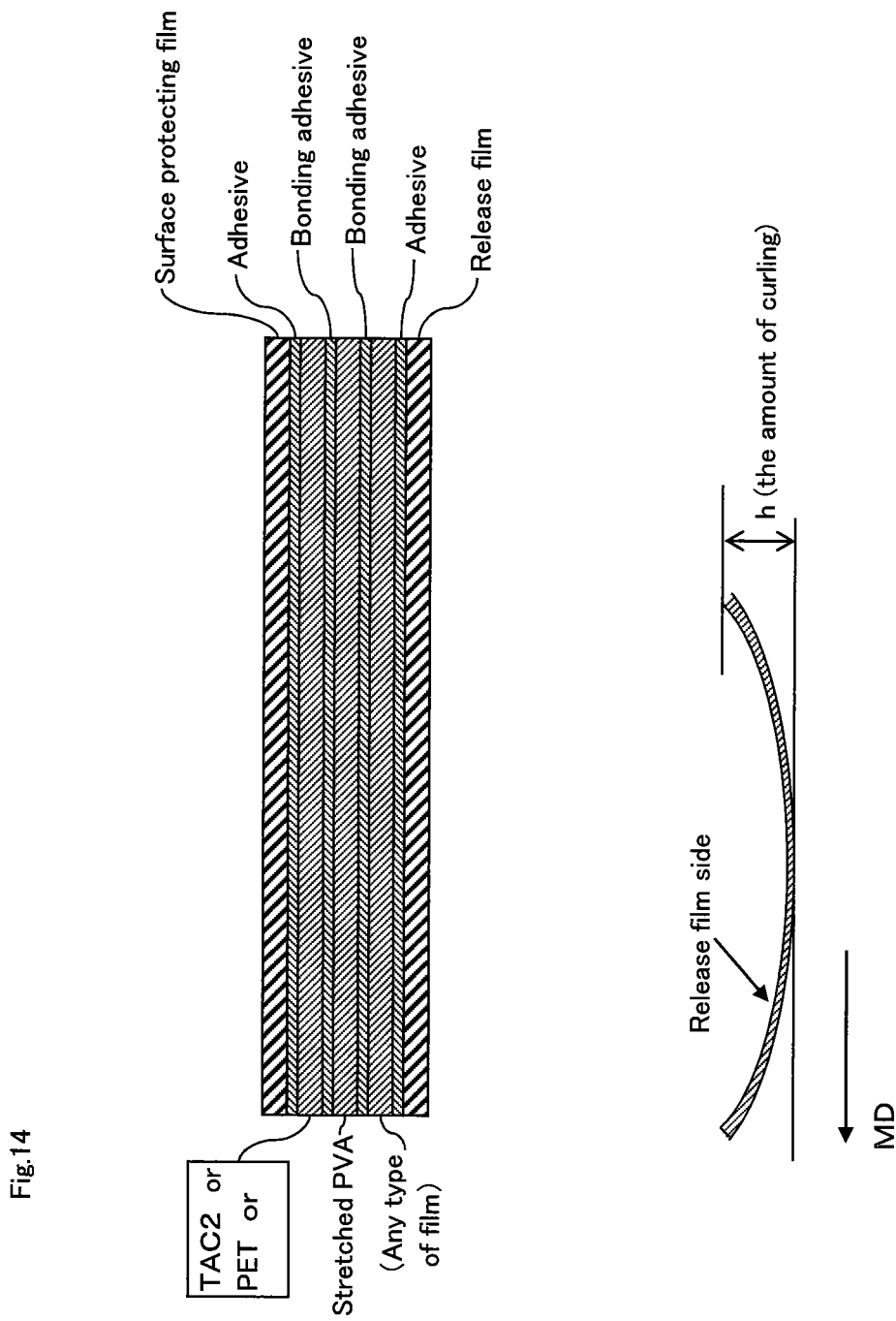
FIG. 14 is a diagram for illustrating a method for measuring the amount of curling.

The measurement is performed under the conditions of a tension speed of 50 mm/minute, a chuck-chuck distance of 10 mm, and room temperature. The elastic modulus is determined from the S-S curve by the method described below. As shown in FIG. 12, a tangent line is dawn from the initial rise point of the S-S curve, and the strength is read at the point where an extension of the tangent line reaches 100% strain. The read value is divided by the cross-sectional area of the sample strip (thickness×sample width (10 mm)), and the quotient is used as the tensile elastic modulus (also generally called Young's modulus).

Table 1 shows examples of the measurement of the elastic modulus and dimensional change rate of polarizers and various films, which are used to form the first optical member and the second optical member described below.

TABLE 1

|  | Thickness | Dimensional change rate (%, 70° C.) | | Elastic modulus (MPa) | | |
|---|---|---|---|---|---|---|
|  | (μm) | MD | TD | MD | TD | Remarks |
| Stretched PVA (polarizer) | 30 | 0.1 | — | 20,000 | — | *1 |
| TAC1 | 40 | 0.2 | 0.1 | 2,500 | 2,000 | KC4UY manufactured by Konica Minolta |
| TAC2 | 80 | 0.1 | 0.2 | 1,500 | 2,000 | TD-80UL manufactured by Fujifilm Corporation |
| TAC3 | 40 | 0.8 | 0.8 | 1,800 | 1,800 | KC-4FR manufactured by Konica Minolta |
| TAC4 | 80 | — | — | 2,000 | 2,000 | WVBZ Film manufactured by Fujifilm Corporation |
| Norbornene-based 1 (Zeonor) | 70 | 0.4 | 0.4 | 1,200 | 1,200 | Zeonor Film Δnd = 65 nm manufactured by ZEON CORPORATION |
| Norbornene-based 2 (Arton) | 50 | 1 | 1 | 1,000 | 1,000 | Arton (note 1) manufactured by JSR Corporation |
| Polycarbonate | — | — | — | 2,400 | — |  |
| PP  Non-stretched | 50 | — | — | 700 | 700 |  |
|   Biaxially-stretched | 20 | — | — | 1,900 | 3,400 |  |
| Acrylic 1 | 30 | 0.6 | 0.6 | 1,500 | 1,500 | The resin of Example 1 disclosed in JP-A No. 2000-230016 |

TABLE 1-continued

|  | Thickness | Dimensional change rate (%, 70° C.) | | Elastic modulus (MPa) | | Remarks |
|---|---|---|---|---|---|---|
|  | (μm) | MD | TD | MD | TD |  |
| PET | 38 | 0.01 | 0.01 | 3,400 | 3,900 | T100 (38 μm) manufactured by Mitsubishi Polyester Film Inc. |

*1: A polyvinyl alcohol film (99.5% in saponification degree, 2,400 in polymerization degree, 75 μm in thickness, manufactured by KURARAY CO., LTD.) was immersed in the baths under the conditions below for the preparation.
(A) The film was allowed to swell in a water bath at 30° C.
(B) The film was dyed in an aqueous iodine solution at 30° C.
(C) The film was crosslinked in an aqueous boric acid solution at 30° C.
(D) The film was stretched to 5 times the initial length of the raw film in a waterbath at 60° C.
(E) The color tone of the film was controlled in an aqueous KI solution at 30° C.
(Note 1)
Arton is a product obtained by stretching an Arton film to 1.5 times in the film-feed direction at a temperature of 155° C. or less.

As is evident from the measurement examples in Table 1, polarizers and various films have different elastic moduli and different dimensional change rates, which impart curling properties to the optical member as a whole. When allowed to run along the feeding line, the optical member in the form of a continuous sheet material is inhibited from curling. During the feeding, however, the problem of peeling of the half-cut member occurs during the feeding, depending on the curling direction or the degree of curling. In the embodiments, the problem of peeling is solved by the feature that the sheet material curls in the longitudinal direction so that the release film is facing inward.

(2) First Cutting Step (S2 in FIG. 1). Subsequently, the first sheet material is fed from the first roll provided and placed, and the first sheet material is cut using cutting means, while the first release film 12 is left uncut. Thus, the members of the sheet material other than the first release film 12, namely, the surface protecting film 13, the adhesive 15, the first optical member 11, and the first adhesive 14 are cut. For example, the cutting means is a laser, a cutter, or any other known cutting device.

(3) First Bonding Step (S3 in FIG. 1). After the first cutting step, the cut piece composed of the other members of the first sheet material 1 is bonded to a substrate A with the first adhesive 14 interposed therebetween, while the first release film 12 is removed. Therefore, even when the first release film 12 is peeled off, the first sheet material 1 can be inhibited from curling in the process of bonding the first optical member 11 to the substrate A. For example, the substrate A is a liquid crystal cell substrate, an organic EL emitting material substrate, or the like. The substrate A is previously subjected to a cleaning treatment before the bonding.

The steps of providing the first material roll, first cutting, and first bonding are each performed in a continuous manufacturing line. A series of the above manufacturing steps are to bond the first optical member 11 to one side of the substrate A. The manufacturing steps to bond a second optical member 21 to the other side are described below.

(4) Step of Providing Second Material Roll (S4 in FIG. 1). A second roll of a second continuous sheet material 2 is provided. As shown in FIG. 2, the laminated structure of the second sheet material 2 includes a second optical member 21, a second release film 22 and a surface protecting film 23. The second optical member 21 includes a second polarizer 21*a* and a second film 21*b* provided on one side thereof with an adhesive layer (not shown) interposed therebetween. The feed-direction elastic modulus of the second polarizer 21*a* differs from that of the second film 21*b*. The second film 21*b* is a polarizer protecting film (e.g., a triacetylcellulose film).

The second release film 22 is provided on the second polarizer 21*a* with a second adhesive 24 interposed therebetween. The surface protecting film 23 is provided on the second film 21*b* with an adhesive 25 interposed therebetween.

(5) Second Cutting Step (S5 in FIG. 1). Subsequently, the second sheet material 2 is fed from the second roll provided and placed, and while the second release film 22 is left uncut, the other members of the second sheet material 2 are cut using cutting means. Thus, the surface protecting film 23, the adhesive 25, the second optical member 21, and the second adhesive 24 are cut, while the second release film 22 is left uncut. For example, the cutting means is a laser, a cutter, or any other known cutting device.

(6) Second Bonding Step (S6 in FIG. 1). After the second cutting step, the cut piece composed of the other members of the second sheet material is bonded to the other side of the substrate A, which is opposite from the side where the first optical member 11 is bonded, with the second adhesive 24 interposed therebetween, while the second release film 22 is removed. Therefore, even when the second release film 22 is peeled off, the second sheet material can be inhibited from curling in the process of bonding the second optical member 21 to the substrate A. As a result, an optical display unit is manufactured that includes the substrate A and optical members provided on both sides, which include the first optical member 11 bonded to one side thereof and the second optical member 21 bonded to the other side thereof.

The steps of providing the first material roll, first cutting, first bonding, providing the second material roll, second cutting, and second bonding are each performed in a continuous manufacturing line.

(7) Preferably, the continuous process further includes an inspecting step (S7 in FIG. 1). Examples of the inspecting step include the step of inspecting the bonded state and the step of inspecting any defect after the bonding. Both inspections are preferably performed, while any one of the inspections may be performed.

(8) The substrate determined as non-defective in the inspecting step is implemented into an optical display device (implementing step). When it is determined as defective, it is subjected to a reworking process in which a new sheet material (or a new optical film) is bonded and then inspected, and when the product is determined as non-defective, it is subjected to the implementing step, but when the product is determined as defective, it is subjected to the reworking process again or discarded. The surface protecting film may be peeled off from the optical member as needed in each manufacturing step.

Another Mode of Embodiment 1

Figure 3:
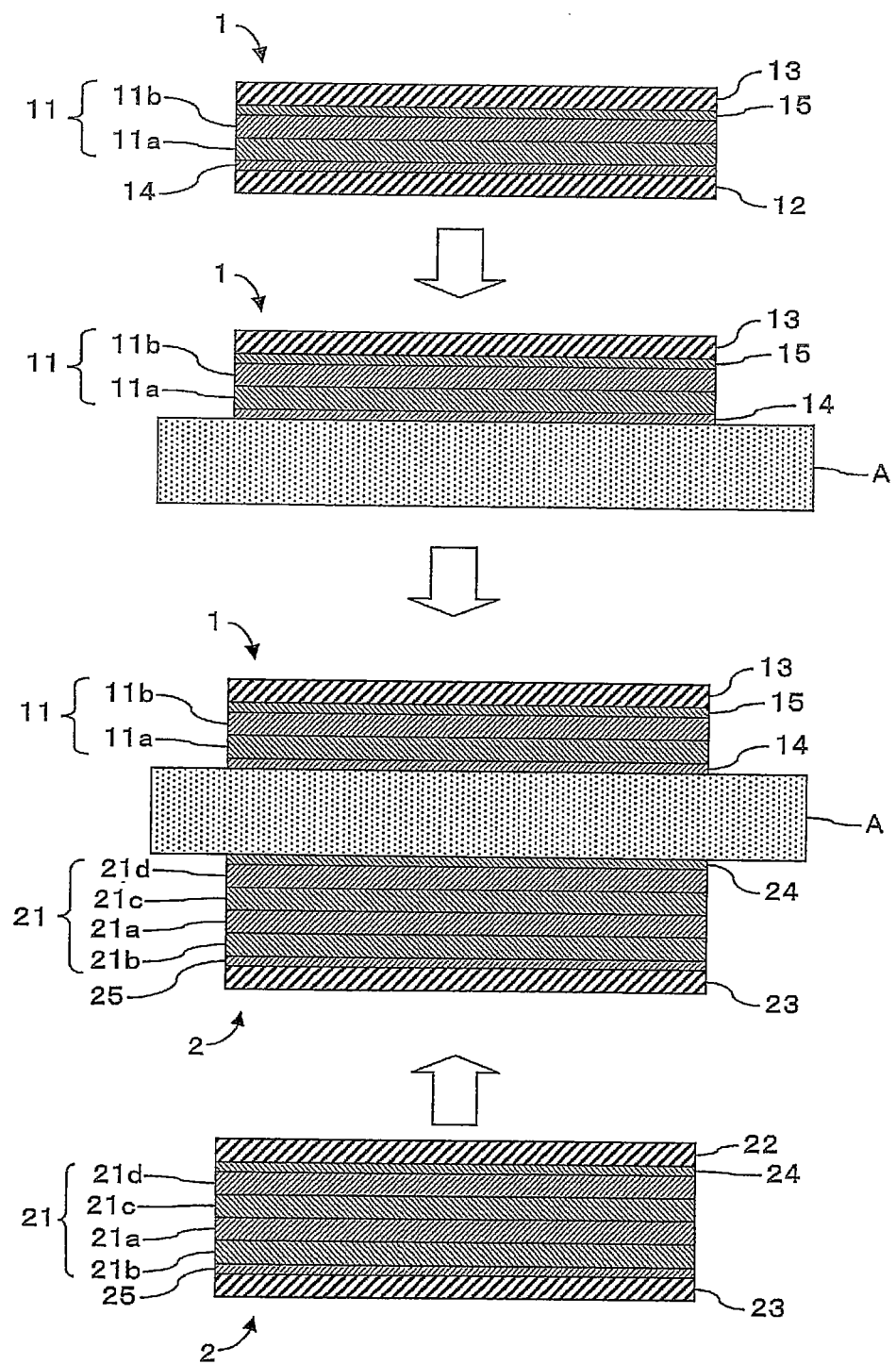
FIG. 3 is a schematic diagram for illustrating an optical film in another mode of Embodiment 1.

Another mode of Embodiment 1 is described below. In this mode, the manufacturing steps are the same as the manufacturing steps (1) to (8) described above, and a description thereof will be omitted. FIG. 3 shows a schematic diagram of the structure of another version of the second sheet material.

As shown in FIG. 3, the laminated structure of the second sheet material 2 includes a second optical member 21, a second release film 22 and a surface protecting film 23. The second optical member 21 includes a second polarizer 21a, a second film 21b provided on one side thereof with a bonding adhesive layer (not shown) interposed therebetween, a third film 21c provided on the other side of the second polarizer 21a with a bonding adhesive layer (not shown) interposed therebetween, and a fourth film 21d provided on the third film 21c with a bonding adhesive layer (not shown) interposed therebetween. The second sheet material 2 curls in the longitudinal direction so that the second release film 22 is facing inward. The second film 21b and the third film 21c are each a polarizer protecting film (e.g., a triacetylcellulose film). The fourth film 21d is a retardation film (e.g., a PI film). The second and third films 21b and 21c, which are opposed to each other with the polarizer 21a interposed therebetween, have different feed-direction elastic moduli. The feed-direction elastic modulus of the fourth film 21d may also differ from those elastic moduli. The second release film 22 is provided on the fourth film 21d with a second adhesive 24 interposed therebetween. The surface protecting film 23 is provided on the second film 21b with an adhesive 25 interposed therebetween.

Embodiment 2

Figure 4:
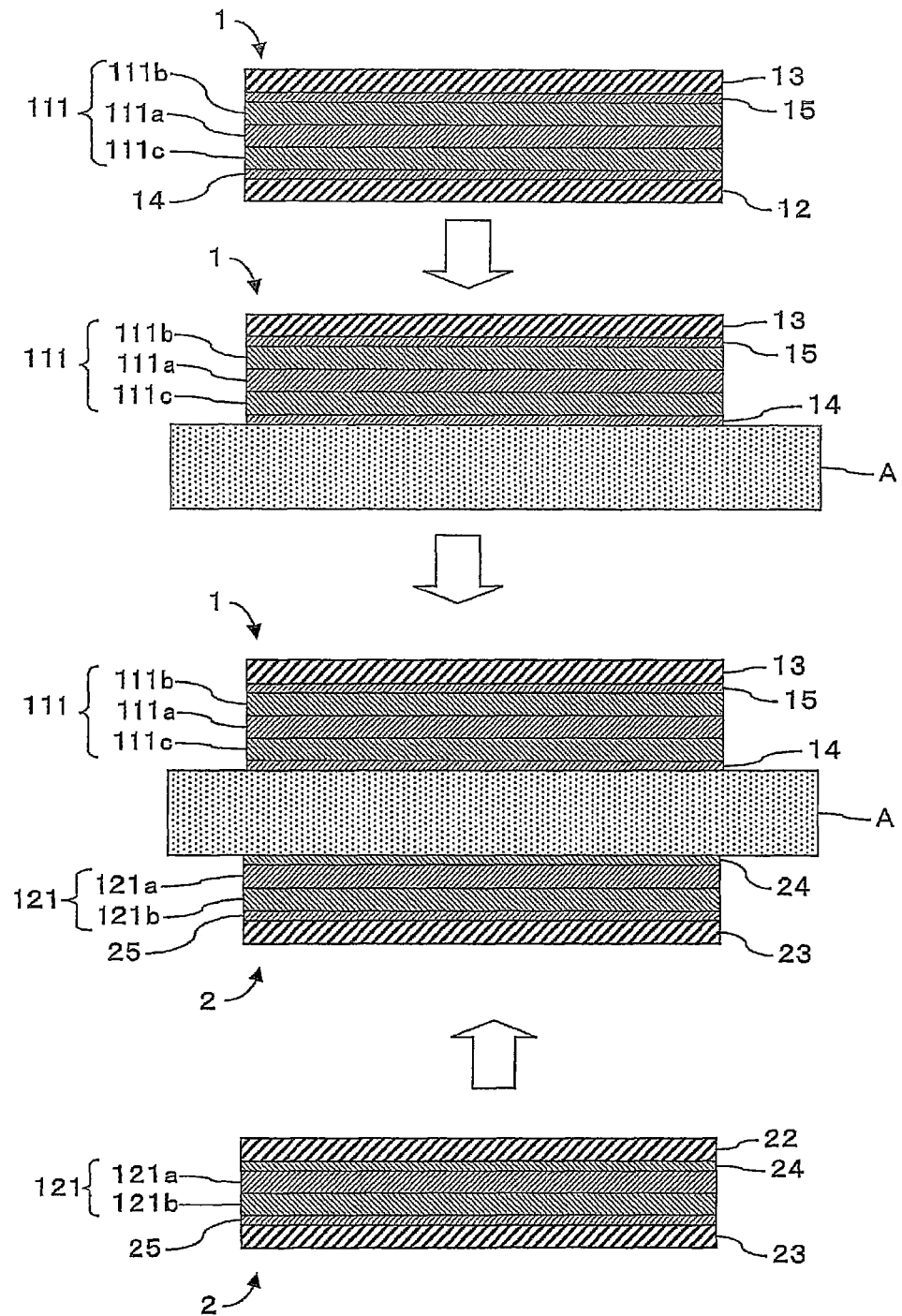
FIG. 4 is a schematic diagram for illustrating an optical member in Embodiment 2.

Embodiment 2 of the invention is described below. In this embodiment, the manufacturing steps are the same as the manufacturing steps (1) to (8) described above for Embodiment 1, and a description thereof will be omitted. FIG. 4 shows a schematic diagram of the structure of first and second optical members for use in Embodiment 2.

FIG. 4 shows an example of the laminated structure of a first sheet material 1. The first sheet material 1 includes a first optical member 111, a first release film 12 and a surface protecting film 13. The first optical member 111 includes a first polarizer 111a, a first film 111b provided on one side thereof with a bonding adhesive layer (not shown) interposed therebetween, and a second film 111c provided on the other side of the first polarizer 111a with a bonding adhesive layer (not shown) interposed therebetween. The first and second films 111b and 111c, which are opposed to each other with the first polarizer 111a interposed therebetween, have different feed-direction elastic moduli. The first sheet material 1 curls in the longitudinal direction so that the first release film 12 is facing inward. The first film 111b may have undergone a surface treatment. The feed-direction elastic modulus is also changed by the surface treatment. The first release film 12 is provided on the second film 111c with a first adhesive 14 interposed therebetween. The surface protecting film 13 is provided on the first film 111b with an adhesive 15 interposed therebetween. The first and second films 111b and 111c are each a polarizer protecting film.

Examples of a combination of the first and second films 111b and 111c include a combination of a TAC film and a TAC film, a combination of a TAC film and an Arton film, a combination of a TAC film and a Zeonor film, and a combination of a TAC film and a polypropylene film. For example, the TAC film is selected from KC4UY manufactured by Konica Minolta, KC-4FR manufactured by Konica Minolta, TD-80UL manufactured by Fujifilm Corporation, WVBZ Film manufactured by Fujifilm Corporation, and so on.

As shown in FIG. 4, the laminated structure of a second sheet material 2 includes a second optical member 121, a second release film 22 and a surface protecting film 23. The second optical member 121 includes a second polarizer 121a and a third film 121b provided thereon with a bonding adhesive layer (not shown) interposed therebetween. The feed-direction elastic modulus of the second polarizer 121a differs from that of the third film 121b. The second sheet material curls in the longitudinal direction so that the second release film 22 is facing inward. The third film 121b is a polarizer protecting film (e.g., a TAC film). The second release film 22 is provided on the second polarizer 121a with a second adhesive 24 interposed therebetween. The surface protecting film 23 is provided on the third film 121b with an adhesive 25 interposed therebetween.

Another Mode of Embodiment 2

Figure 5:
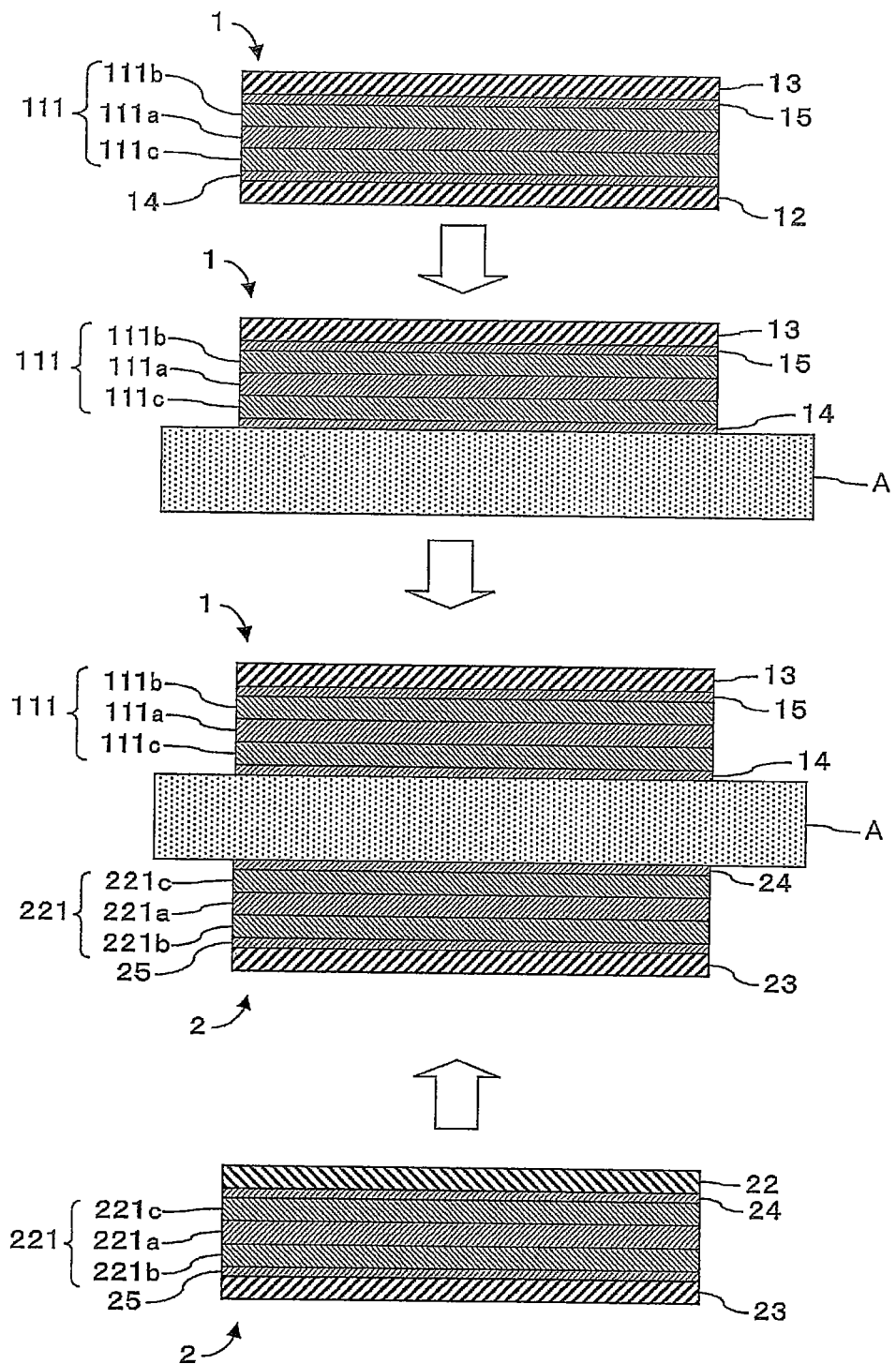
FIG. 5 is a schematic diagram for illustrating an optical film in another mode of Embodiment 2.

Another mode of Embodiment 2 is described below. In this embodiment, a second optical member 121 with a different structure is used instead. FIG. 5 shows a schematic diagram of the structure of another version of the second sheet material 2.

As shown in FIG. 5, the laminated structure of the second sheet material 2 includes a second optical member 221, a second release film 22 and a surface protecting film 23. The second optical member 221 includes a second polarizer 221a, a third film 221b provided on one side thereof with a bonding adhesive layer (not shown) interposed therebetween, and a fourth film 221c provided on the other side of the second polarizer 221a with a bonding adhesive layer (not shown) interposed therebetween. The third and fourth films 221b and 221c, which are opposed to each other with the second polarizer 221a interposed therebetween, have different feed-direction elastic moduli. The second sheet material curls in the longitudinal direction so that the second release film 22 is facing inward. The second release film 22 is provided on the fourth film 221c with a second adhesive 24 interposed therebetween. The surface protecting film 23 is provided on the third film 221b with an adhesive 25 interposed therebetween. The third and fourth films 221b and 221c are each a polarizer protecting film.

Examples of a combination of the third and fourth films 221b and 221c include a combination of a TAC film and a TAC film, a combination of a TAC film and an Arton film, a combination of a TAC film and a Zeonor film, a combination of a TAC film and a polypropylene film, a combination of an acrylic film and a KC-4FR film manufactured by Konica Minolta, a combination of an acrylic film and a WVBZ film, a combination of an acrylic film and an Arton film, a combination of an acrylic film and a Zeonor film, a combination of an acrylic film and a polypropylene film, a combination of a polyethylene terephthalate film and a KC-4FR film manufactured by Konica Minolta, a combination of a polyethylene terephthalate film and a WVBZ film, a combination of a polyethylene terephthalate film and an Arton film, a combination of a polyethylene terephthalate film and a Zeonor film, and a combination of a polyethylene terephthalate film and a polypropylene film. For example, the TAC film is selected from KC4UY manufactured by Konica Minolta, KC-4FR manufactured by Konica Minolta, TD-80UL manufactured by Fujifilm Corporation, WVBZ Film manufactured by Fujifilm Corporation, and so on.

Examples of a combination (of the first and second films 111b and 111c) in the first optical member 111 versus a combination (of the third and fourth films 221b and 221c) in the second optical member 221 include a combination of a TAC film and a TAC film versus a combination of a TAC film and a WVBZ film, a combination of a TAC film and an Arton film, a combination of a TAC film and a Zeonor film, a combination of an acrylic film and a WVBZ film, a combination of an acrylic film and an Arton film, a combination of an acrylic film and a Zeonor film, a combination of a polyethylene terephthalate film and a WVBZ film, a combination of a polyethylene terephthalate film and an Arton film, or a combination of a polyethylene terephthalate film and a Zeonor film; a combination of a TAC film and a KC-4FR film versus a combination of a TAC film and a KC-4FR film, a combination of an acrylic film and a KC-4FR film or a combination of a polyethylene terephthalate film and a KC-4FR film; a combination of a TAC film and an Arton film versus a combination of a TAC film and an Arton film, a combination of a TAC film and a Zeonor film, a combination of an acrylic film and an Arton film, a combination of an acrylic film and a Zeonor film, a combination of a polyethylene terephthalate film and an Arton film, or a combination of a polyethylene terephthalate film and a Zeonor film; a combination of a TAC film and a Zeonor film versus a combination of a TAC film and an Arton film, a combination of a TAC film and a Zeonor film, a combination of an acrylic film and an Arton film, a combination of an acrylic film and a Zeonor film, a combination of a polyethylene terephthalate film and an Arton film, or a combination of a polyethylene terephthalate film and a Zeonor film; and a combination of a TAC film and a polypropylene film versus a combination of a TAC film and a polypropylene film, a combination of an acrylic film and a polypropylene film, or a combination of a polyethylene terephthalate film and a polypropylene film.

Skip Cutting Method

Another mode of the first and second cutting steps is described below. Information about defects in each of the first and second sheet materials (such as coordinates of defects, defect type, and defect size) may be attached as coded information (such as QR codes or bar codes) to one widthwise end portion of each of the first and second material rolls. In such a case, the coded information may be read and analyzed at a stage before cutting, and then in each of the first and second cutting steps, the material may be cut into a specific size so that the defects can be separated (this process is also referred to as skip cutting). The system may be configured so that the defect-containing portion can be rejected or bonded to a certain member other than the substrate and that the cut piece of the optical member having a specific size and determined as non-defective can be bonded to the substrate. This process significantly improves the yields of the optical display unit.

Embodiment 3

Figure 7:
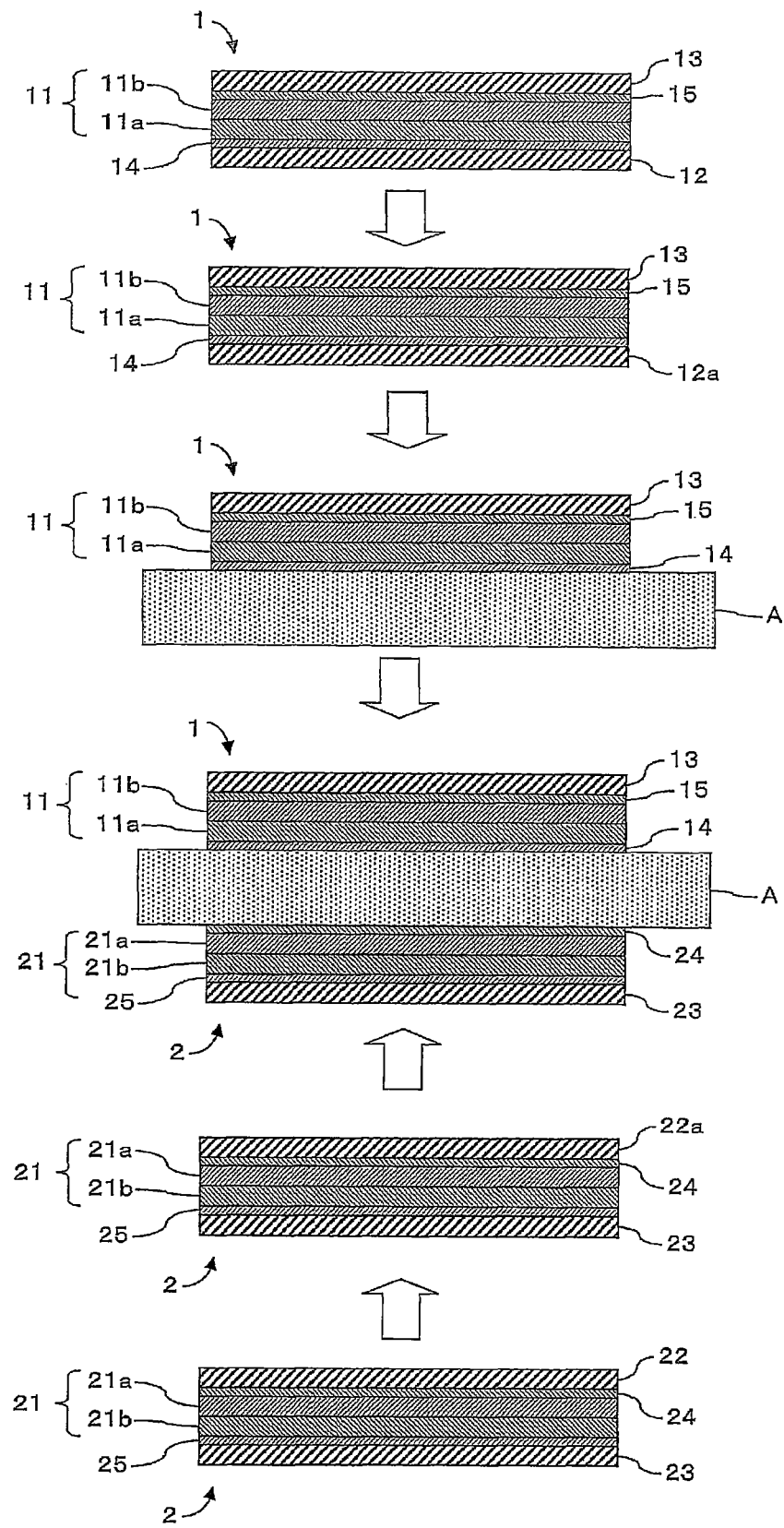
FIG. 7 is a schematic diagram for illustrating an optical member in Embodiment 3.

Embodiment 3 of the invention is described below. FIG. 6 shows a flow chart of the method of Embodiment 3 for manufacturing an optical display unit. FIG. 7 shows a schematic diagram of the structure of first and second optical members for use in Embodiment 3.

(1) Step of Providing First Material Roll (S1 in FIG. 6). A first roll of a first continuous sheet material is provided. As shown in FIG. 7, the laminated structure of the first sheet material 1 includes a first optical member 11, a first release film 12 and a surface protecting film 13. The first optical member 11 includes a first polarizer 11a and a first film 11b provided on one side thereof with a bonding adhesive layer (not shown) interposed therebetween. The feed-direction elastic modulus of the first polarizer 11a differs from that of the first film 11b. The first sheet material 1 curls in the longitudinal direction so that the first release film 12 is facing inward. The first film 11b is a polarizer protecting film (e.g., a triacetylcellulose film). The first film 11b may have undergone a surface treatment. The first release film 12 is provided on the first polarizer 11a with a first adhesive 14 interposed therebetween. The surface protecting film 13 is provided on the first film 11b with an adhesive 15 interposed therebetween.

(2) Step of Removing first Release Film (S61 in FIG. 6). The first sheet material 1 is then fed from the first roll provided and placed, and the first release film 12 is removed. Examples of a method for removing the first release film 12 include a method including continuously delaminating the film, while winding the delaminated film into a roll, a method including cutting only the first release film into a unit of a given size and delaminating and removing the unit with an adhesive tape, and other known removing methods.

(3) First Defect Inspecting Step (S62 in FIG. 6). After the step of removing the first release film, defect inspection is performed. Defect inspection can be performed on the first optical member 11 without the need to take into account the inherent retardation of the first release film 12. Defect inspection may be performed using known methods.

(4) Step of Bonding Second Release Film (S63 in FIG. 6). After the first defect inspecting step, a second release film 12a is bonded to the first polarizer 11a with the first adhesive 14 interposed therebetween. In order to maintain the flatness, the bonding step is preferably performed so that bubbles such as air bubbles can be prevented from being trapped.

(5) First Cutting Step (S64 in FIG. 6). After the step of bonding the second release film, the other members of the first sheet material are cut using cutting means, while the second release film 12a is left uncut. Therefore, the surface protecting film 13, the adhesive 15, the first optical member 11, and the first adhesive 14 may be cut, while the second release film 12a is left uncut.

(6) First Bonding Step (S65 in FIG. 6). After the first cutting step, the cut piece composed of the other members of the first sheet material is bonded to a substrate A with the first adhesive 14 interposed therebetween, while the second release film 12a is removed. Therefore, even when the second release film 12a is peeled off, the first sheet material 1 can be inhibited from curling in the process of bonding the first optical member 11 to the substrate A.

The steps of providing the first material roll, removing the first release film, first defect inspection, bonding the second release film, first cutting, and first bonding are each performed in a continuous manufacturing line. A series of the above manufacturing steps are to bond the first optical member 11 to one side of the substrate A. The manufacturing steps to bond a second optical member 21 to the other side are described below.

(7) Step of Providing Second Material Roll (S4 in FIG. 6). A second roll of a second continuous sheet material 2 is provided. As shown in FIG. 7, the laminated structure of the second sheet material 2 includes a second optical member 21, a third release film 22 and a surface protecting film 23. The second optical member 21 includes a second polarizer 21a and a second film 21b provided on one side thereof with an adhesive layer (not shown) interposed therebetween. The feed-direction elastic modulus of the second polarizer 21a differs from that of the second film 21b. The second sheet material 2 curls in the longitudinal direction so that the third release film 22 is facing inward. The second film 21b is a polarizer protecting film (e.g., a triacetylcellulose film). The third release film 22 is provided on the second polarizer 21a with a second adhesive 24 interposed therebetween. The surface protecting film 23 is provided on the second film 21b with an adhesive 25 interposed therebetween.

(8) Step of Removing Third Release Film (S66 in FIG. 6). The second sheet material is then fed from the second roll provided and placed, and the third release film 22 is removed. The method described above or the like may be used to remove the third release film 22.

(9) Second Defect Inspecting Step (S67 in FIG. 6). After the step of removing the third release film, defect inspection is performed. Defect inspection can be performed on the second optical member 21 without the need to take into account the inherent retardation of the third release film 22. Defect inspection may be performed using known methods.

(10) Step of Bonding Fourth Release Film (S68 in FIG. 6). After the second defect inspecting step, a fourth release film 22a is bonded to the second polarizer 21a with the second adhesive 24 interposed therebetween. In order to maintain the flatness, the bonding step is preferably performed so that bubbles such as air bubbles can be prevented from being trapped.

(11) Second Cutting Step (S69 in FIG. 6). After the step of bonding the fourth release film, the other members of the second sheet material 2 are cut using cutting means, while the fourth release film 22a is left uncut. Therefore, the surface protecting film 23, the adhesive 25, the second optical member 21, and the second adhesive 24 may be cut, while the fourth release film 22a is left uncut.

(12) Second Bonding Step (S70 in FIG. 6). After the second cutting step, the cut piece composed of the other members of the second sheet material is bonded to the other side of the substrate A, which is opposite from the side where the first optical member 11 is bonded, with the second adhesive 24 interposed therebetween, while the fourth release film 22a is removed. Therefore, even when the fourth release film 22a is peeled off, the second optical member 21 can be inhibited from curling in the process of bonding the second optical member 21 to the substrate A. As a result, an optical display unit is manufactured that includes the substrate A and optical members provided on both sides, which include the first optical member 11 bonded to one side thereof and the second optical member 21 bonded to the other side thereof.

The steps of providing the first material roll, removing the first release film, first defect inspection, bonding the second release film, first cutting, first bonding, providing the second material roll, removing the third release film, second defect inspection, bonding the fourth release film, second cutting, and second bonding are each performed in a continuous manufacturing line.

(13) Preferably, the continuous process further includes an inspecting step (S7 in FIG. 6). The inspecting step, the implementing step, and the reworking process may be the same as those described above.

Another Mode of Embodiment 3

Figure 8:
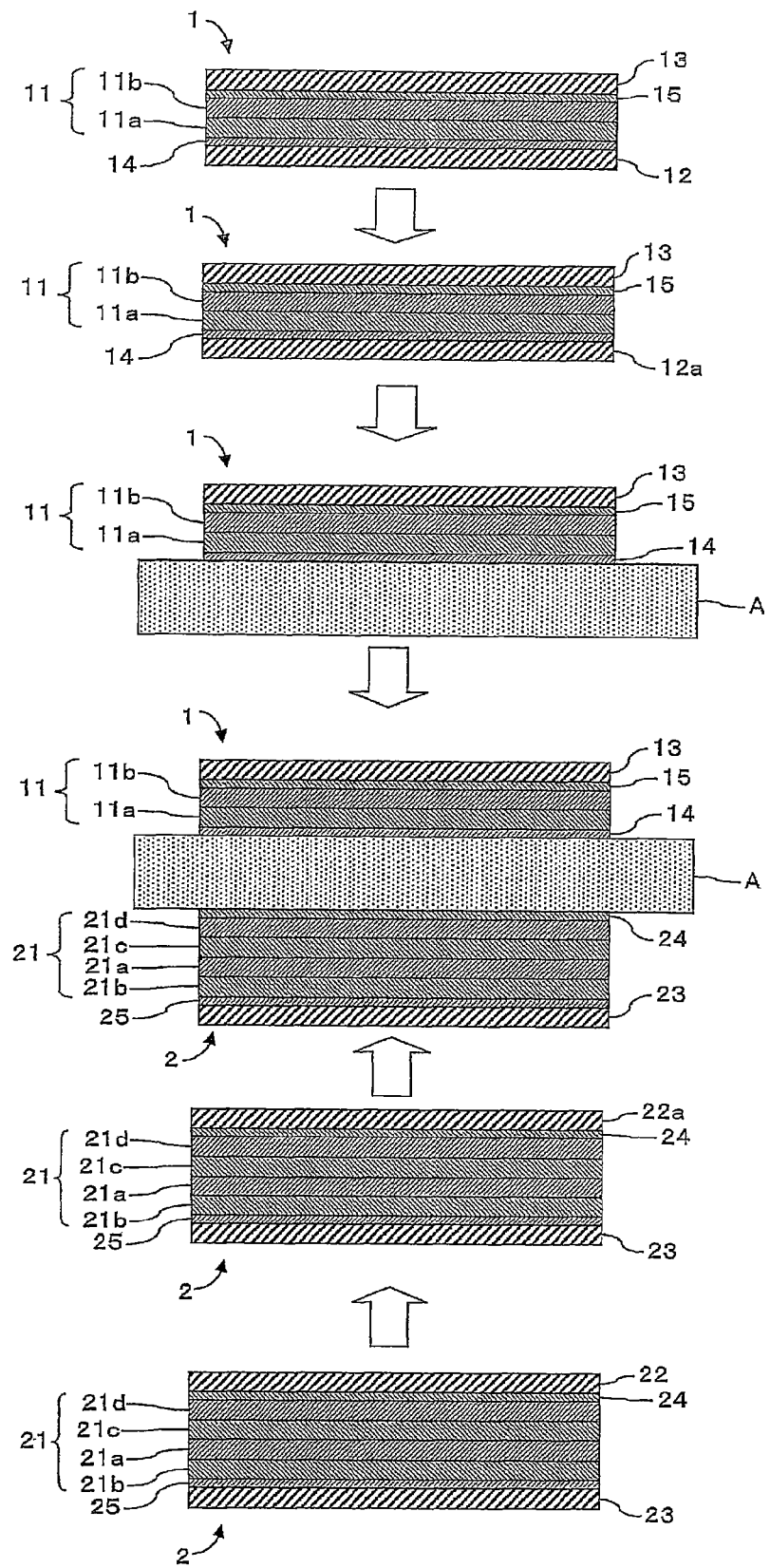
FIG. 8 is a schematic diagram for illustrating an optical film in another mode of Embodiment 3.

Another mode of Embodiment 3 is described below. In this mode, the manufacturing steps are the same as the manufacturing steps (1) to (13) described above, and a description thereof will be omitted. FIG. 8 shows a schematic diagram of the structure of another version of the second sheet material 2.

As shown in FIG. 8, the laminated structure of the second sheet material 2 includes a second optical member 21, a third release film 22 and a surface protecting film 23. The second optical member 21 includes a second polarizer 21a, a second film 21b provided on one side thereof with a bonding adhesive (not shown) interposed therebetween, a third film 21c provided on the other side of the second polarizer 21a with a bonding adhesive layer (not shown) interposed therebetween, and a fourth film 21d provided on the third film 21c with a bonding adhesive layer (not shown) interposed therebetween. The second film 21b and the third film 21c are each a polarizer protecting film (e.g., a triacetylcellulose film). The fourth film 21d is a retardation film (e.g., a PI film). The second and third films 21b and 21c, which are opposed to each other with the polarizer 21a interposed therebetween, have different feed-direction elastic moduli. The feed-direction elastic modulus of the fourth film 21d may also differ from those elastic moduli. The second sheet material 2 curls in the longitudinal direction so that the third release film 22 is facing inward. The third release film 22 is provided on the fourth film 21d with a second adhesive 24 interposed therebetween. The surface protecting film 23 is provided on the second film 21b with an adhesive 25 interposed therebetween.

The third release film 22 is removed, before defect inspection is performed. The fourth release film 22a is then bonded to the third film 21d with the second adhesive 24 interposed therebetween. The cutting step and the second bonding step are then performed as described above for Embodiment 3.

Embodiment 4

Figure 9:
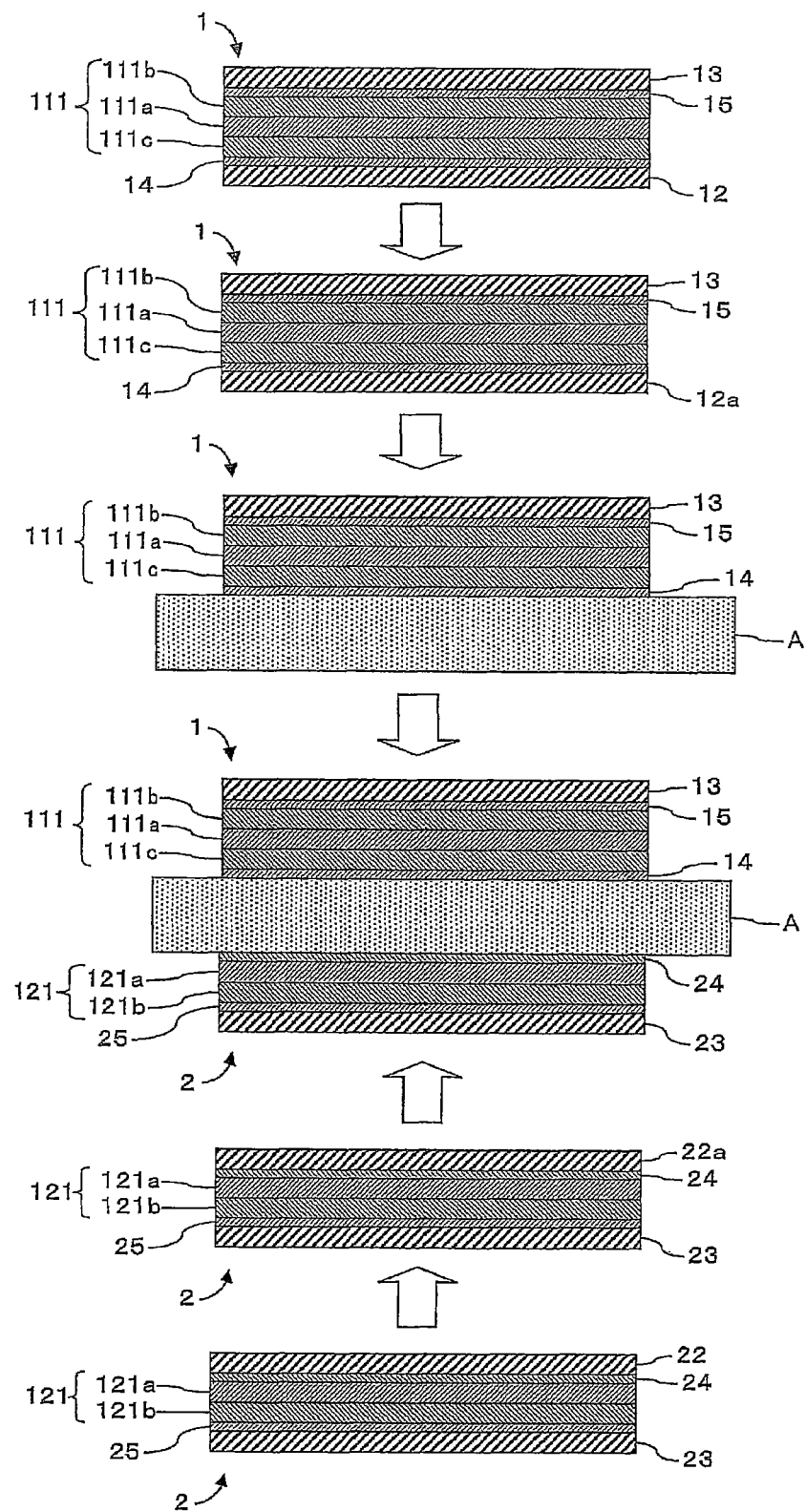
FIG. 9 is a schematic diagram for illustrating an optical member in Embodiment 4.

Embodiment 4 of the invention is described below. In this embodiment, the manufacturing steps are the same as the manufacturing steps (1) to (14) described above for Embodiment 3, and a description thereof will be omitted. FIG. 9 shows a schematic diagram of the structure of first and second optical members for use in Embodiment 4.

FIG. 9 shows an example of the laminated structure of a first sheet material 1. The first sheet material 1 includes a first optical member 111, a first release film 12 and a surface protecting film 13. The first optical member 111 includes a first polarizer 111a, a first film 111b provided on one side thereof with a bonding adhesive layer (not shown) interposed therebetween, and a second film 111c provided on the other side of the first polarizer 111a with a bonding adhesive layer (not shown) interposed therebetween. The first and second films 111b and 111c, which are opposed to each other with the first polarizer 111a interposed therebetween, have different feed-direction elastic moduli. The first sheet material curls in the longitudinal direction so that the first release film 12 is facing inward. The first film 111b may have undergone a surface treatment. The feed-direction elastic modulus is also changed by the surface treatment. The first release film 12 is provided on the second film 111c with a first adhesive 14 interposed therebetween. The surface protecting film 13 is provided on the first film 111b with an adhesive 15 interposed therebetween. The first film 111b is a polarizer protecting film.

Examples of a combination of the first and second films 111b and 111c include a combination of a TAC film and a TAC film, a combination of a TAC film and an Arton film, a combination of a TAC film and a Zeonor film, and a combination of a TAC film and a polypropylene film. Examples of the structure of the TAC film include those described above.

As shown in FIG. 9, the first release film 12 is removed, and defect inspection is performed. A second release film 12a is then bonded to the second film 111c with the first adhesive 14 interposed therebetween.

As shown in FIG. 9, the laminated structure of a second sheet material 2 includes a second optical member 121, a third release film 22 and a surface protecting film 23. The second optical member 121 includes a second polarizer 121a and a second film 121b provided on one side thereof with a bonding adhesive layer (not shown) interposed therebetween. The feed-direction elastic modulus of the second polarizer 121a differs from that of the second film 121b. The second sheet material curls in the longitudinal direction so that the third release film 22 is facing inward. The second film 121b is a polarizer protecting film (e.g., a TAC film). The third release film 22 is provided on the second polarizer 121a with a second adhesive 24 interposed therebetween. The surface protecting film 23 is provided on the second film 121b with an adhesive 25 interposed therebetween.

As shown in FIG. 9, the second release film 22 is removed, and defect inspection is performed. A fourth release film 22a is then bonded to the second polarizer 121a with the second adhesive 24 interposed therebetween.

Another Mode of Embodiment 4

Figure 10:
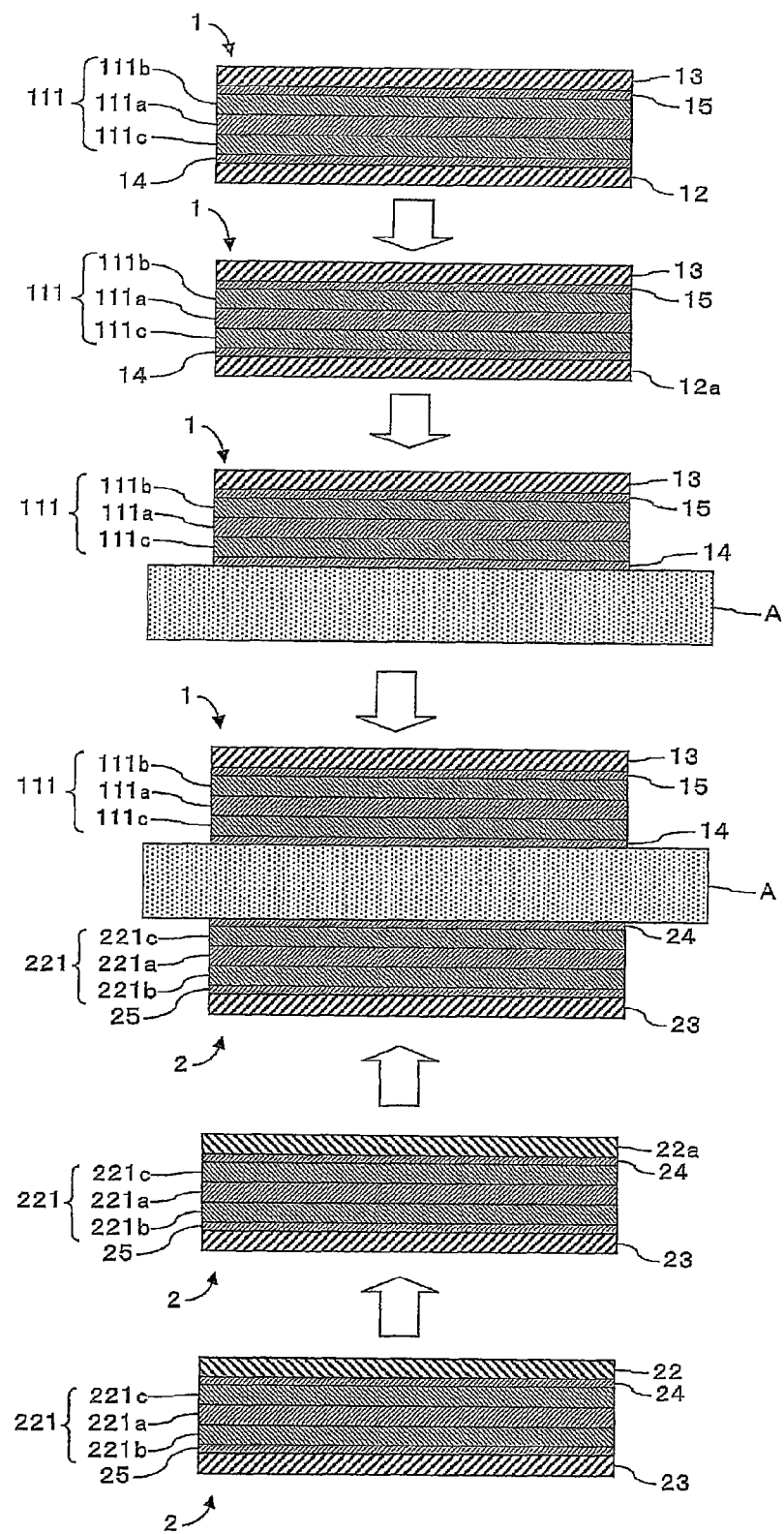
FIG. 10 is a schematic diagram for illustrating an optical member in another mode of Embodiment 4.

Another mode of Embodiment 4 is described below. In this embodiment, a second optical member 221 with a different structure is used instead. FIG. 10 shows a schematic diagram of the structure of another version of the second sheet material 2.

As shown in FIG. 10, the laminated structure of the second sheet material 2 includes a second optical member 221, a third release film 22 and a surface protecting film 23. The second optical member 221 includes a second polarizer 221a, a third film 221b provided on one side thereof with a bonding adhesive layer (not shown) interposed therebetween, and a fourth film 221c provided on the other side of the second polarizer 221a with a bonding adhesive layer (not shown) interposed therebetween. The third and fourth films 221b and 221c, which are opposed to each other with the second polarizer 221a interposed therebetween, have different feed-direction elastic moduli. The second sheet material curls in the longitudinal direction so that the third release film 22 is facing inward. The third release film 22 is provided on the fourth film 221c with a second adhesive 24 interposed therebetween. The surface protecting film 23 is provided on the third film 221b with an adhesive 25 interposed therebetween.

As shown in FIG. 10, the third release film 22 is removed, and defect inspection is performed. A fourth release film 22a is then bonded to the fourth film 221c with the second adhesive 24 interposed therebetween. The third and fourth films 221b and 221c are each a polarizer protecting film.

Examples of a combination of the third and fourth films 221b and 221c include those listed above for a combination in another mode of Embodiment 2.

Examples of a combination (of the first and second films 111b and 111c) in the first optical member 111 versus a combination (of the third and fourth films 221b and 221c) in the second optical member 221 include those listed above for a combination versus a combination in another mode of Embodiment 2.

Preferred Manufacturing Systems for Performing the Manufacturing Methods of Embodiments 1 to 4

Figure 11A:
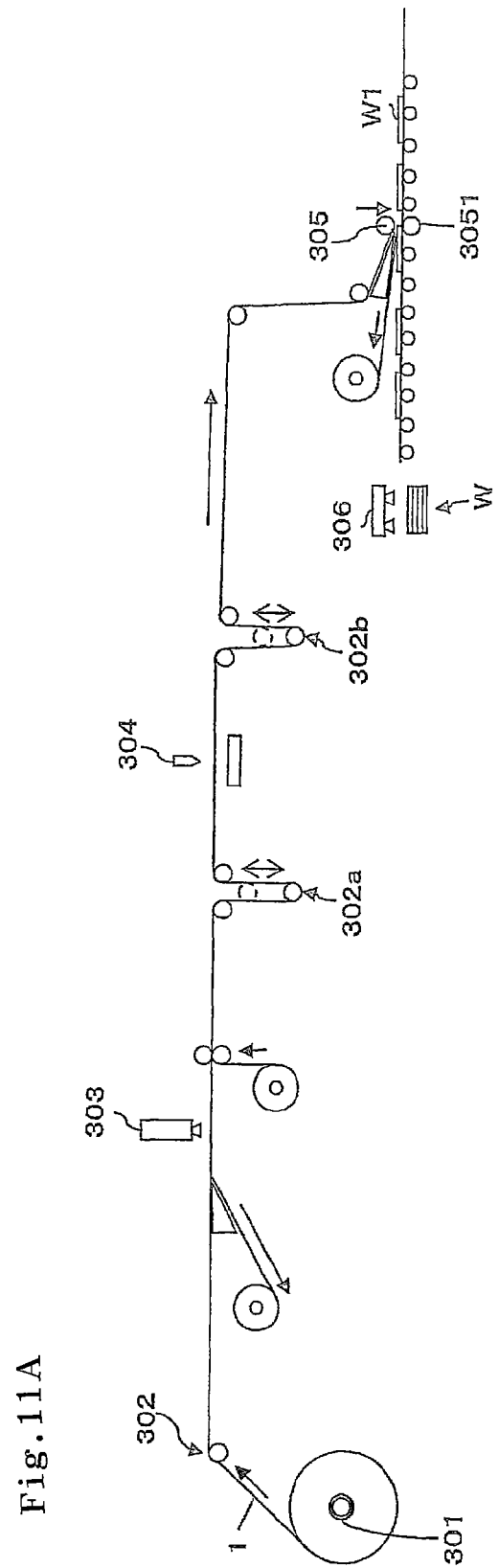
FIG. 11A is a diagram for illustrating the configuration of a manufacturing system according to the invention.
Figure 11B:
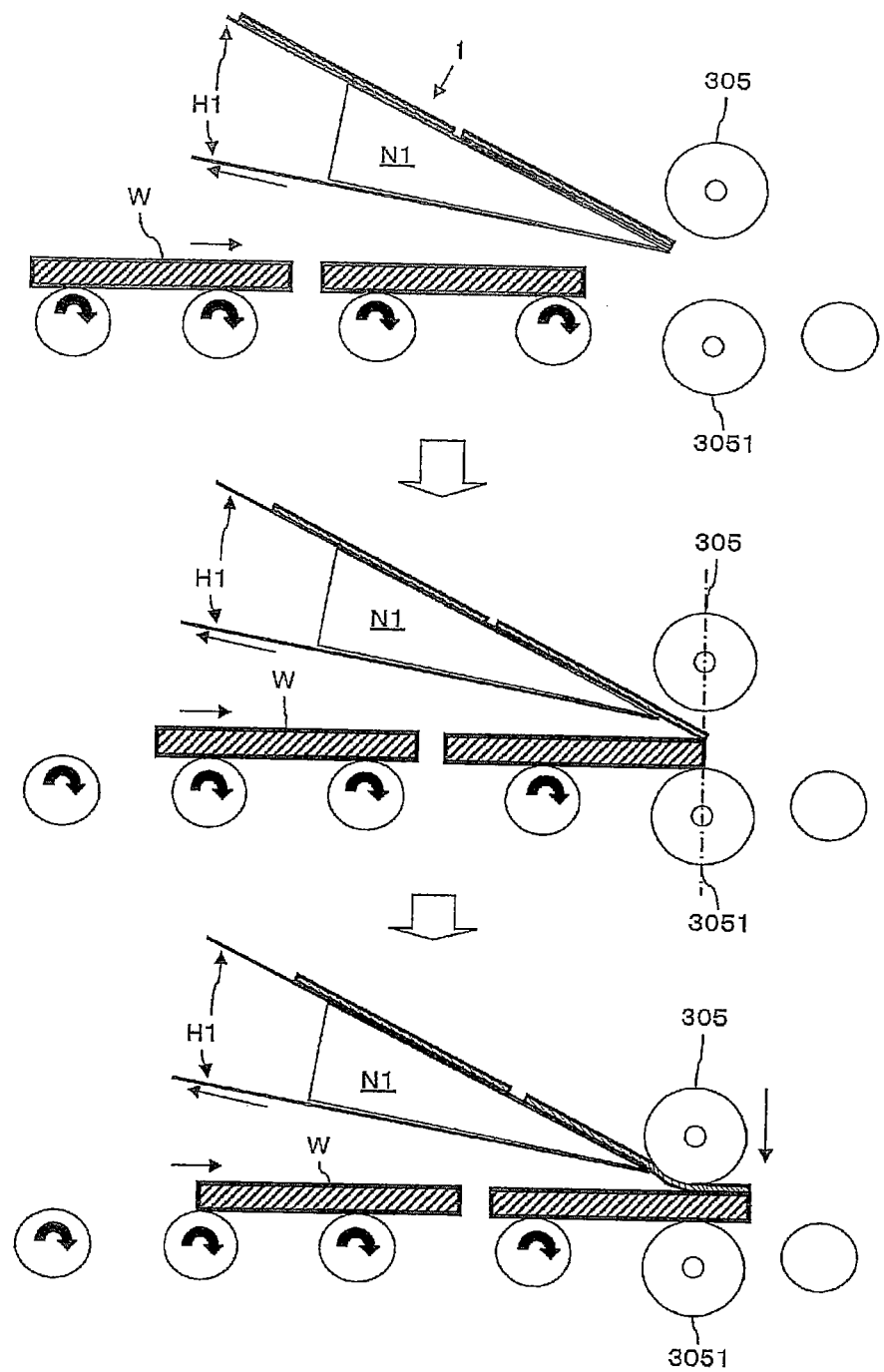
FIG. 11B is a diagram for illustrating the configuration of a manufacturing system according to the invention.

A preferred manufacturing system for performing the manufacturing method of Embodiment 3 or 4 is described below. FIGS. 11A and 11B schematically show the configuration of the manufacturing system.

As shown in FIGS. 11A and 11B, the manufacturing system includes: a first manufacturing unit for bonding the first optical member 1 to the substrate and a second manufacturing unit for bonding the second optical member to the surface of the substrate other than the substrate surface to which the first optical member is bonded.

The first manufacturing unit includes: first mounting means on which the first roll of the first continuous sheet material 1 is mounted; first feeding means for feeding the first sheet material 1 from the first material roll; first release film-removing means for removing the first release film from the first sheet material 1 being fed; first defect inspecting means for performing defect inspection after the removal of the first release film; second release film-bonding means for bonding the second release film to the first sheet material 1 with the first adhesive interposed therebetween after the first defect inspection; first cutting means for cutting the other members of the first sheet material 1 with the second release film left uncut, after the bonding of the second release film; first bonding means for bonding the cut piece composed of the other members of the first sheet material 1, from which the second release film is being removed, to the substrate with the first adhesive interposed therebetween after the first cutting; and first control means for synchronizing and controlling the respective means.

The second manufacturing unit includes: second mounting means on which the second roll of the second continuous sheet material 2 is mounted; second feeding means for feeding the second sheet material from the second material roll; third release film-removing means for removing the third release film from the second sheet material 2 being fed; second defect inspecting means for performing defect inspection after the removal of the third release film; fourth release film-bonding means for bonding the fourth release film to the second sheet material 2 with the adhesive interposed therebetween after the second defect inspection; second cutting means for cutting the other members of the second sheet material 2 with the fourth release film left uncut, after the bonding of the fourth release film; second bonding means for bonding the cut piece composed of the other members of the second sheet material 2, from which the fourth release film is being removed, to the surface of the substrate other than the substrate surface to which the first optical member is bonded, with the second adhesive interposed therebetween; and second control means for synchronizing and controlling the respective means.

The first and second manufacturing units may be each independently driven or driven in a synchronized manner. The first and second control means may be used to drive and control a series of the steps in a synchronized manner. In the manufacturing methods of Embodiments 1 and 2, the release film removing means, the defect inspecting means, and the release film bonding means are omitted from the system.

First Manufacturing Unit

First mounting means 301 includes a roller mount apparatus on which the first roll of the first continuous sheet material 1 is mounted and which is geared to a motor or the like to rotate freely or at a certain speed. The first control means controls the rotational speed and the driving.

First feeding means 302 feeds the first sheet material 1 from the first roll and to each step. A tension controller is placed at a key point in each step. The first feeding means 302 is controlled by the first control means 307.

The first release film-removing means is configured to delaminate and remove the first release film from the first sheet material 1 being fed and to wind it into a roll. The speed of winding it into the roll is controlled by the first control means. The delaminating mechanism (see FIG. 11B) has a sharp-ended knife edge and is configured so that the first release film can be delaminated and removed by taking up the first release film with the knife edge and turning the direction of the feeding and that the first sheet material 1 separated from the first release film can be fed in the feeding direction.

First defect inspecting means 303 inspects defects after the removal of the first release film. The first defect inspecting means 303 includes a CCD camera or a CMOS camera, and the image data taken by it are sent to the first control means. The first control means analyzes the image data to detect defects and calculates their position coordinates. The defect position coordinates are used in the skip cutting process with the first cutting means described below.

Second release film-bonding means bonds the second release film to the first sheet material with the first adhesive interposed therebetween after the first defect inspection. As shown in FIG. 11A, the second release film is unwound from a roll of the second release film, and the second release film and the first sheet material are inserted between one or more pairs of rollers so that they are bonded to each other under a certain pressure from the pair of rollers. The rotational speed of the pair of rollers, the pressure, and the feeding are controlled by the first control means.

While leaving the second release film uncut, first cutting means 304 cuts the other members of the first sheet material 1 after the bonding of the second release film. The first cutting means 304 is a laser. Based on the defect position coordinates detected by the first defect inspection, the first cutting means 304 cuts the material into the predetermined size in such a manner that defective portions can be separated. Therefore, cut pieces having any defective portion are rejected as defective in a later step. Alternatively, the first cutting means 304 may ignore defective portions and continuously cut the material into the predetermined size. In this case, the bonding process may be designed not to bond, but to remove the defective portion or to bond the defective portion to a temporary plate unit, as described below. In this case, the first control means also functions to control the process.

The first cutting means 304 also includes a holding table placed to adsorb and hold the first sheet material 1 from the back side, and the laser is placed above the first sheet material 1. The laser is moved in the horizontal direction to scan the first sheet material 1 in the width direction, so that the surface protecting film, the adhesive layer, the first optical member, and the first adhesive are cut at a predetermined pitch in the feeding direction, while the second release film at the bottom is left uncut. In the laser system, an air nozzle for blowing a warm wind to the portion being cut and a smoke collecting duct for collecting gas (smoke) generated from the portion being cut and carried by the warm wind are preferably configured in combination and placed opposite to each other across the width of the first sheet material 1. The feeding mechanism includes step rollers 302a and 302b provided vertically movable upward and downward so that continuous feeding of the first sheet material 1 can be prevented from being stopped on the upstream and downstream sides when the holding table adsorbs the first sheet material 1. This operation is also controlled by the first control means.

After the first cutting process, first bonding means bonds the cut piece, which is composed of the other members of the first sheet material 1, to a substrate W with the first adhesive interposed therebetween, while it removes the second release film. In the bonding process as shown in FIG. 11B, a press roller 305 and a guide roller 3051 are used to press the first sheet material 1 against the surface of the substrate W so that it can be bonded to the surface. The pressure and movement of the press roller 305 are controlled by the first control means. The delamination mechanism has a sharp-ended knife edge N1 and is configured so that the second release film H1 can be peeled off by taking up the second release film H1 with the knife edge N1 and turning the direction of the feeding and that the first sheet material 1 peeled off from the second release film H1 can be fed to the surface of the substrate W. This process may include applying a tension of 150 N/m to 1,000 N/m to the second release film and/or pressing the first sheet material 1 against the surface of the substrate W within 3 seconds from the removal of the second release film H1, so that the first sheet material 1 can be bonded with improved accuracy. If the tension is less than 150 N/m, the position from which the first sheet material 1 is fed may be unstable. If it is more than 1,000 N/m, the second release film H1 may be elongated to break. If the time until the pressing is longer than 3 seconds, the end portion of the first sheet material 1 peeled off from the second release film H1 may be bent so that folding or air bubbles may occur. The bonding mechanism includes the press roller 305 and the guide roller 3051 opposed thereto. The guide roller 3051 includes a rubber roller driven by a motor, and immediately above the guide roller 3051, the press roller 305 comprising a metallic roller driven by a motor is provided movable upward and downward. When the substrate W is fed to the bonding position, the press roller 305 is elevated to a position higher than the upper surface so that the space between the rollers is widened. Alternatively, the guide roller 3051 and the press roller 305 may each be a rubber roller or a metallic roller. The substrate W has been previously cleaned and stored. It is placed on the feeding mechanism by suction feeding means 306, which is also controlled by the first control means.

Second Manufacturing Unit

In the second manufacturing unit for the respective steps, the second mounting means, the second feeding means, the third release film removing means, the second defect inspecting means, the fourth release film bonding means, the second cutting means, and the second bonding means are the same as the corresponding means of the first manufacturing unit, and therefore, a description thereof is omitted.

The substrate W1 processed in the first manufacturing unit is fed to the second manufacturing unit. The substrate W1 is turned upside down in the feeding process or in the second manufacturing unit. The turning means (not shown) is configured to suck the substrate W1 from the upper side by sucking means, lift it, turn it upside down, and place it the feeding mechanism again. The second control means functions to control this process. In another embodiment, the second manufacturing unit may be configured not to turn it upside down. In this case, the second manufacturing unit is configured to perform each step with the second sheet material 2 being held in a reversed state (with the release film facing upward), unlike the usual state, and to bond the second optical member to the lower side of the substrate W1. When the bonding is performed so that the second optical member can be in 90° relation (crossed Nicol relation) to the first optical member, the substrate W1 is turned by 90°, and then the second optical member is bonded thereto.

The first and second control means control the means for the respective steps so that they can be synchronized. The timing of the operation of each means is calculated by a method using sensors placed at specific locations or by a method of detecting the rotating part of the feeding mechanism with a rotary encoder or the like. The first and second control means may be implemented in cooperation with software programs and hardware resources such as CPU and memories. In this case, program software, procedures, various settings, and so on are previously stored in memories. Private circuits, firmware, or the like may also be used for the implementation.

Other Embodiments

In the above embodiments, defect-containing sheet materials are bonded to temporary plate units and collected. Alternatively, such materials may be bonded to a belt-shaped separator so that they can be collected in the form of a roll.

The defect inspection may be performed using known defect inspection methods. Examples of defect inspection methods include inspection with automatic inspection equipment and visual inspection by a checker. Automatic inspection equipment includes a system to automatically inspect defects (also referred to as flaws) in the sheet material, which performs a process including applying light to the material, capturing the reflected-light image or the transmitted-light image through an imaging unit such as a line sensor or a two-dimensional TV camera, and detecting defects based on the captured image data. The image data are also captured through a polarizing filter placed for inspection in the optical path between the light source and the imaging unit. In general, the polarization axis (e.g., polarized light absorption axis) of the polarizing filter for inspection is placed so as to be orthogonal (crossed-Nicol) to the polarization axis (e.g., polarized light absorption axis) of the polarizing plate as the test object. In the crossed-Nicol configuration, no defect allows a full black image to be input from the imaging unit, while any defect portion is detected as being not black (observed as a bright spot). Therefore, if an appropriate threshold is determined, defects can be detected. In such bright spot detection, defects such as surface deposits and internal foreign matter are detected as bright spots. Besides the bright spot detection, a method including capturing the transmitted-light image of the object with CCD and analyzing the image to detect foreign matter is also applicable. In addition, a method including capturing the reflected-light image of the object with CCD and analyzing the image to detect foreign matter deposited on the surface is also applicable.

The cutting step has been described with respect to the method of cutting the members of the sheet material other than the release film (half cutting method). In an embodiment of the invention, however, the cutting step is not limited to such a cutting method. Other modes of the cutting step and the bonding step are described below with reference to FIGS. 15 and 16.

Full Cutting Method Using Carrier Film

Figure 15:
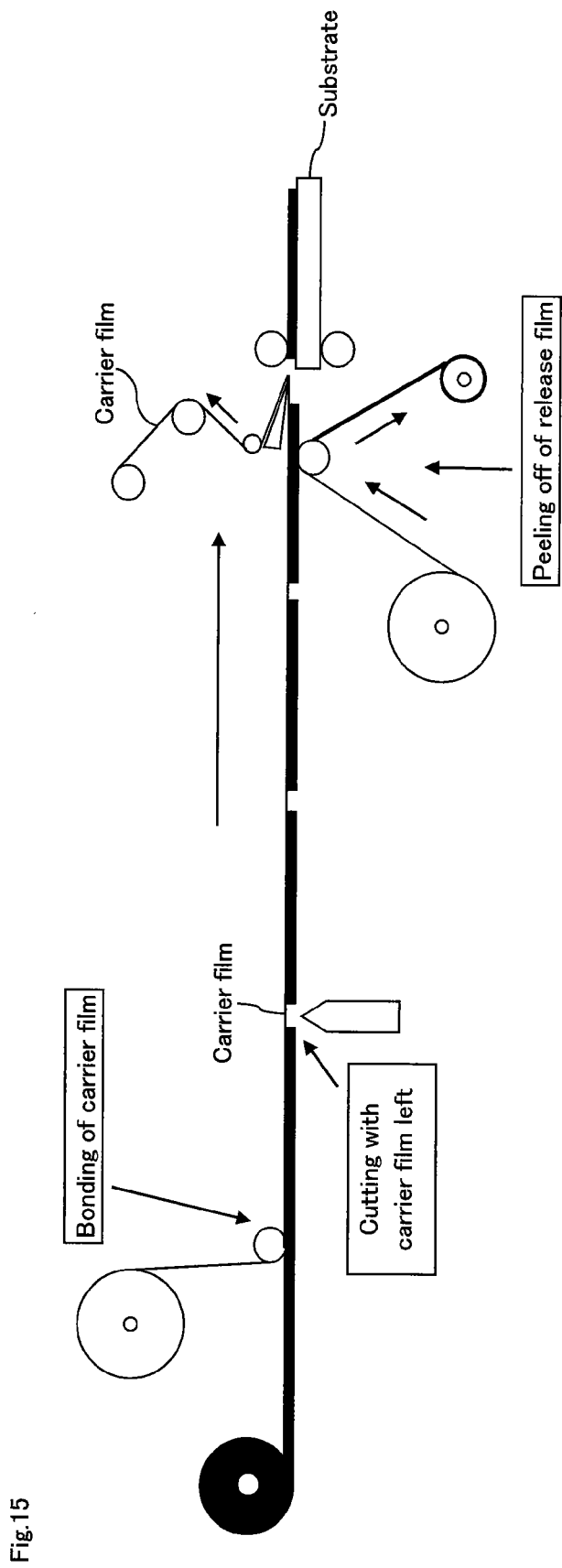
FIG. 15 is a diagram for illustrating a cutting method and a bonding method in another embodiment.

A full cutting method using a carrier film is described with reference to FIG. 15. A roll of a carrier film is placed at a location where the sheet material is fed. For example, the carrier film is an adhesive tape or an adhesive tape. First, the carrier film is fed from the roll and bonded to the surface protecting film of the sheet material, while it is pressed with a roll. Subsequently, all the members of the sheet material being fed together with the carrier film are cut, without cutting the carrier film. An adhesive tape is then fed from a roll thereof and bonded to the release film, while it is pressed with a roll. The adhesive tape is taken up so that the release film can be peeled off. Subsequently, the same method as shown in FIG. 11B is used in which the sheet material is bonded to the substrate using a press roller and a guide roller, while the carrier film is peeled off using a knife edge part. Alternatively, the carrier film may be peeled off, after the sheet material is bonded to the substrate.

Half Cutting Method with Surface Protecting Film Left Uncut

Figure 16:
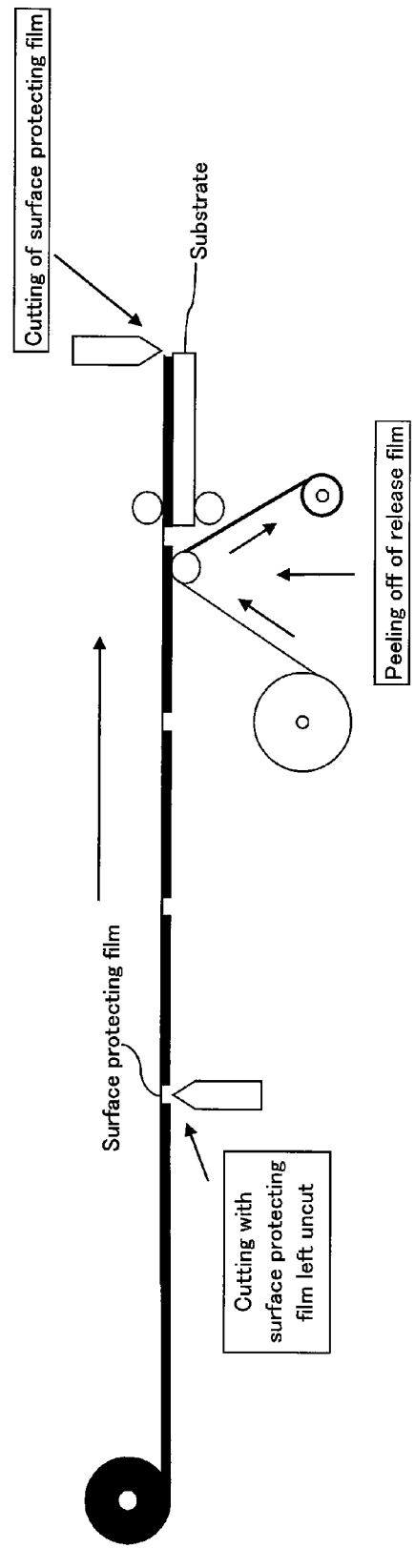
FIG. 16 is a diagram for illustrating a cutting method and a bonding method in a further embodiment.

A method of cutting the members of the sheet material other than the surface protecting film is described with reference to FIG. 16. First, while the surface protecting film is left uncut, the other members of the sheet material being fed are cut. Subsequently, the same peeling step as shown in FIG. 15 is used in which an adhesive tape is fed from a roll thereof and bonded to the release film, while it is pressed with a roll, and the adhesive tape is taken up so that the release film can be peeled off. The same method as shown in FIG. 11B is then used in which the sheet material is bonded to the substrate using a press roller and a guide roller. The surface protecting film is then cut by cutting means.

Optical Member

Some examples have been described with respect to the polarizer used to form the first and second optical members and a polarizer protecting film used on one or both sides of the polarizer. However, general examples include the materials described below. A polarizer and a film or films to be placed on one or both sides of the polarizer may be selected from the examples so that they can have different feed-direction elastic moduli and different dimensional change rates, and a combination thereof may be used.

Polarizer

The processes of dyeing, crosslinking and stretching a polyvinyl alcohol film are not necessarily independently performed and may be performed at the same time or in any order. The polyvinyl alcohol film may be subjected to a swelling process before use. The process may generally include the steps of immersing the polyvinyl alcohol film in a solution containing iodine or a dichroic dye so that the film is dyed with the iodine or the dichroic dye being adsorbed thereto, then washing the film, uniaxially stretching the film to 3 to 7 times in a solution containing boric acid, borax or the like, and then drying the film. It is particularly preferred that the step of stretching the film in a solution containing iodine or a dichroic dye should be followed by the steps of further stretching the film in a solution containing boric acid, borax or the like (two-stage stretching) and then drying the film, so that the iodine can be highly oriented to provide good polarizing properties.

For example, the polyvinyl alcohol polymer may be a polymer produced by polymerizing vinyl acetate and then saponifying the polymer or a copolymer produced by copolymerizing vinyl acetate with a small amount of a copolymerizable monomer such as an unsaturated carboxylic acid, an unsaturated sulfonic acid, or a cationic monomer. The average polymerization degree of the polyvinyl alcohol polymer is preferably, but not limited to, 1,000 or more, more preferably from 2,000 to 5,000. The saponification degree of the polyvinyl alcohol polymer is preferably 85% by mole or more, more preferably from 98 to 100% by mole.

The thickness of the produced polarizer is generally, but not limited to, from 5 to 80 µm. The thickness of the polarizer may be controlled by any conventional method such as tentering, roll stretching, or rolling.

As a non-limiting example, the polarizer and a polarizer-protecting transparent film serving as a protective layer may be bonded to each other with a bonding adhesive such as a bonding adhesive including a vinyl alcohol polymer or a bonding adhesive including a vinyl alcohol polymer and a water-soluble crosslinking agent therefor such as boric acid, borax, glutaraldehyde, melamine, or oxalic acid. The bonding adhesive layer may be formed by applying and drying an aqueous solution layer. In the process of preparing the aqueous solution, if necessary, any other additive or a catalyst such as an acid may also be added.

Polarizer Protecting Film

Any appropriate transparent film may be used as the polarizer protecting film to be placed one or both sides of the polarizer. For example, thermoplastic reins with a high level of transparency, mechanical strength, thermal stability, water-blocking performance, isotropy, or the like may be used. Examples of such thermoplastic resins include cellulose resins such as triacetylcellulose, polyester resins, polyethersulfone resins, polysulfone resins, polycarbonate resins, polyamide resins, polyimide resins, polyolefin resins, (meth) acrylic resins, cyclic polyolefin resins (norbornene resins), polyarylate resins, polystyrene resins, polyvinyl alcohol resins, and any blend thereof. While a transparent protective film may be bonded to one side of the polarizer with an adhesive layer, a thermosetting resin or an ultraviolet-curable resin such as a (meth)acrylic, urethane, acrylic urethane, epoxy, or silicone resin may be used to form a transparent protective film on the other side of the polarizer. The transparent protective film may contain any one or more appropriate additives. Examples of such an additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, even more preferably from 60 to 98% by weight, in particular, preferably from 70 to 97% by weight. If the content of the thermoplastic resin in the transparent protective film is less than 50% by weight, high transparency and other properties inherent in the thermoplastic resin may be insufficiently exhibited. Amorphous PO films, cycloolefin polymer (COP) films, Arton films (manufactured by JSR Corporation), Zeonor films (manufactured by Zeon Corporation), and so on may also be used.

The polymer film described in JP-A No. 2001-343529 (WO01/37007) may also be used, for example, which comprises a resin composition containing (A) a thermoplastic resin having a substituted and/or unsubstituted imide group in the side chain and (B) a thermoplastic resin having a substituted and/or unsubstituted phenyl and nitrile groups in the side chain. Specifically, the film comprises a resin composition containing an alternating copolymer of isobutylene and N-methylmaleimide and an acrylonitrile-styrene copolymer. The film may be produced by mixing-extrusion of the resin composition. These films have a low level of retardation and photoelastic coefficient and thus can prevent polarizing plates from having defects such as strain-induced unevenness. They also have low water-vapor permeability and thus have high humidity resistance.

The thickness of the transparent protective film is generally from about 1 to about 500 μm, in particular, preferably from 1 to 300 μm, more preferably from 5 to 200 μm, in view of strength, workability such as handleability, thin layer formability, or the like, while it may be determined as needed. A transparent protective film with a thickness of 5 to 150 μm is particularly preferred.

For practical use, the optical member may also have a multilayered structure in which various optical layers are laminated. Examples of such optical layers include, but are not limited to, layers formed by performing hard coating treatment, antireflection treatment, or surface treatment for anti-sticking, diffusion or antiglare purpose on the transparent protective film surface to which no polarizer will be bonded (the surface on which the bonding adhesive coating layer is not provided), and oriented liquid crystal layers for viewing angle compensation or other purposes. An optical film(s) for use in forming a liquid crystal display or the like, such as a reflector, a transflector, a retardation plate (including a wavelength plate (λ plate) such as a half or quarter wavelength plate), or a viewing angle compensation film may also be used in the form of a layer or a laminate of two or more layers.

Retardation Plate

An example of the optical film to be placed on the polarizer includes a retardation plate. Examples of the retardation plate include birefringent films produced by uniaxially or biaxially stretching polymer materials, oriented liquid crystal polymer films, and oriented liquid crystal polymer layers supported on films. The stretching process may be typically performed by roll stretching, long-gap stretching, tenter stretching, or tubular stretching. Uniaxial stretching is generally performed to a stretch ratio of about 1.1 to about 3. The thickness of the retardation plate is generally, but not limited to, from 10 to 200 μm, preferably from 20 to 100 μm.

Examples of the polymer materials include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyvinyl alcohol, polyamide, polyimide, polyolefin, polyvinyl chloride, cellulose polymers, and various types of binary or ternary copolymers thereof, graft copolymers thereof, and any blend thereof. Any of these polymer materials may be formed into an oriented product (a stretched film) by stretching or the like.

Viewing Angle Compensation Film

Another example of the optical film to be placed on the polarizer includes a viewing angle compensation film. The viewing angle compensation film is for expanding the viewing angle so that images can be relatively clearly viewed even when the screen of a liquid crystal display is viewed from directions not perpendicular but somewhat oblique to the screen. Examples of such a viewing angle compensation retardation plate include a retardation film, an oriented film of a liquid crystal polymer or the like, and an oriented layer of a liquid crystal polymer or the like supported on a transparent substrate. General retardation plates are produced with a polymer film that is uniaxially stretched in the in-plane direction and has birefringence. On the other hand, retardation plates for use as the viewing angle compensation film are produced with a bi-directionally stretched film such as a polymer film that is biaxially stretched in the in-plane direction and has birefringence, a polymer film that is uniaxially stretched in the in-plane direction and also stretched in the thickness direction so that it has a controlled refractive index in the thickness direction and has birefringence, and an obliquely oriented film. Examples of the obliquely oriented film include a film produced by a process including bonding a heat-shrinkable film to a polymer film and stretching and/or shrinking the polymer film under the action of the heat-shrinkage force, and an obliquely-oriented liquid crystal polymer film. The raw material polymer for the retardation plate may be the same as the polymer described above for the retardation plate, and any appropriate polymer may be used depending on the purpose such as prevention of coloration caused by changes in viewing angle based on the retardation of a liquid crystal cell and expansion of the viewing angle at which good visibility is achieved.

In order to expand the viewing angle at which good visibility is achieved, an optical compensation retardation plate is preferably used, which includes a triacetylcellulose film and an optically-anisotropic layer of an oriented liquid crystal polymer, specifically an obliquely-oriented discotic liquid crystal polymer layer, supported on the film.

Brightness Enhancement Film

A laminate of a polarizing plate and a brightness enhancement film is generally placed on the back side of a liquid crystal cell, when used. The brightness enhancement film exhibits the property that when light is incident on it from a backlight of a liquid crystal display or the like or when natural light is reflected from the back side and incident on it, it reflects linearly polarized light with a specific polarization axis or reflects circularly polarized light in a specific direction and transmits the other part of the light. When light from a light source such as a backlight is incident on a laminate of a polarizing plate and a brightness enhancement film, transmitted light in a specific polarization state is produced, and light in the state other than the specific polarization state is not transmitted but reflected. The light reflected from the surface of the brightness enhancement film may be reversed by a reflective layer or the like provided behind the brightness enhancement film and allowed to reenter the brightness enhancement film so that the light can be entirely or partially transmitted in the specific polarization state. In this case, the quantity of the light transmitted through the brightness enhancement film can be increased, and polarized light, which is less likely to be absorbed by the polarizer, can be supplied so that the brightness can be enhanced by increasing the quantity of the light available at a liquid crystal image display or the like.

Examples of the brightness enhancement film that may be used include a film having the property of transmitting linearly polarized light with a specific polarization axis and reflecting the other type of light, such as a dielectric multilayer thin film or a multilayer laminate of thin films different in refractive index anisotropy, and a film having the property of reflecting one of clockwise circularly polarized light and counterclockwise circularly polarized light and transmitting the other, such as an oriented cholesteric liquid crystal polymer film or an oriented cholesteric liquid crystal layer supported on a film substrate.

Adhesive

In an embodiment of the invention, the polarizing plate or the optical member is provided with an adhesive layer for bonding it to another component such as a liquid crystal cell. The adhesive layer may be formed of any appropriate adhesive such as an acrylic adhesive according to conventional techniques. The adhesive layer preferably has low moisture absorption coefficient and high heat resistance, in order to prevent moisture absorption-induced foaming or peeling, to prevent optical property degradation due to a thermal expansion difference or the like, to prevent warping of a liquid crystal cell, and to form an image display with high quality and high durability. The adhesive layer may also contain fine particles so as to have light diffusing properties. The adhesive layer may be provided as needed on a necessary surface. Concerning a polarizing plate comprising a polarizer and a polarizer protecting film layer, for example, an adhesive layer may be provided as needed on one or both sides of the polarizer protecting layer.

Release Film

The exposed surface of the adhesive layer may be temporarily covered with a release film (it may also called "separator") for antifouling or the like until it is put to use. This can prevent contact with the adhesive layer during usual handling. A conventional appropriate separator may be used, such as an appropriate thin leave including a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

Surface Protecting Member

A surface protecting member may be provided on the opposite side of the optical member from the side where the separator is provided. A surface protecting film may be formed as the surface protecting member through a weak adhesive. The main purpose thereof is anti-scratch, antifouling, or the like. For example, the surface protecting film may be a single layer of a plastic film or a laminate of plastic film layers. Examples of the surface protecting member include an appropriate thin leave such as a plastic film, a rubber sheet, a paper sheet, a cloth, a nonwoven fabric, a net, a foam sheet, a metal leaf, or a laminate thereof, which is optionally coated with any appropriate release agent such as a silicone, long-chain alkyl or fluoride release agent, or molybdenum sulfide.

In an embodiment of the invention, an ultraviolet absorbing capability may be imparted to the polarizer, the polarizer protecting film, or any other film such as the surface protecting film or the release film, or each layer such as the adhesive, for example, by treatment with an ultraviolet-absorbing agent such as a salicylate ester compound, a benzophenol compound, a benzotriazole compound, a cyanoacrylate compound, or a nickel complex salt compound.

Optical Image Display

In an embodiment of the invention, the optical member is preferably used to form an image display such as a liquid crystal display, an organic electroluminescence display (organic EL display) or a plasma display panel (PDP).

In an embodiment of the invention, the optical member is preferably used to form any of various devices such as liquid crystal displays. Liquid crystal displays may be formed according to conventional techniques. Specifically, a liquid crystal display may be typically formed by assembling a liquid crystal cell and optical films, and optional components such as a lighting system and by incorporating a driving circuit according to conventional techniques, except that the optical film is used according to the invention. Any type of liquid crystal cell such as TN type, STN type or n type may be used.

EXAMPLES

Sheet materials including optical members having different film structures were each bonded to a substrate using the manufacturing method of Embodiment 4 described above. The results are shown in Tables 2 and 3. In addition, a 38 μm thick polyethylene terephthalate film (surface protecting film) is provided on the TAC1- or TAC2-side surface layer of the sheet material with an about 20 μm thick acrylic bonding adhesive interposed therebetween, and a 25 μm thick polyethylene terephthalate film (release film) is provided on the α-film- or stretched PVA-side of the sheet material with an about 20 μm thick acrylic bonding adhesive interposed therebetween.

Figure 17:
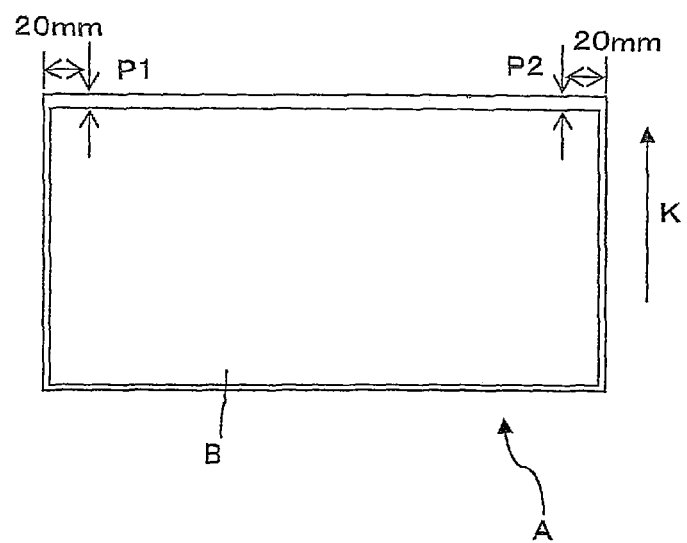
FIG. 17 is a diagram for illustrating a method for measuring the bonding accuracy in the examples.

FIG. 17 shows a method for measuring the bonding accuracy. A sheet material B is bonded to a substrate A according to a bonding direction k. At each of positions P1 and P2 of the substrate A, the distance between the end faces of the substrate and the optical member is measured. P1 and P2 are each located 20 mm from each widthwise end face of the substrate A. The bonding position is set in advance, and the set point is achieved, if the bonding is perfect. Each set point is 5.5 mm. The bonding accuracy is obtained by subtracting the measured value from the set point. If the calculated value is negative, it means that relative to the substrate A, the bonded sheet material B deviates in a direction opposite to the bonding direction k. If the calculated value is positive, it means that relative to the substrate A, the bonded sheet material B deviates in the bonding direction k. In this case, the sheet material B includes the optical member and the surface protecting film.

In the evaluation of peeling on a roll, the sheet material after half cutting was turned back at an angle of 180° and a velocity of 5 m/minute on a roll with a diameter of 75 mm, and how the sheet material peeled from the release film was observed at the time of the turning. A peel of 10 mm or more, a peel of less than 10 mm, and no peel were expressed by the marks "x," "Δ" and "○," respectively. The elastic modulus, the dimensional change rate and the amount of curling were also measured by the methods described above.

TABLE 2

| EXAMPLES | Structure of first and second layers of optical member | Structure of α-film third layer of optical member | Thickness of α-film (μm) | Dimensional change rate of α-film (%, 70° C.) MD | Elastic modulus of α-film (MPa) MD | MD curling state of sheet material (note 2) | Amount of MD curing of sheet material (mm) | Bonding accuracy (mm) P1 | Bonding accuracy (mm) P2 | Peeling on roll |
|---|---|---|---|---|---|---|---|---|---|---|
| 1 | Structure (TAC2/stretched PVA/α) | TAC1: KC4UY manufactured by Konica Minolta | 40 | 0.2 | 2,500 | Minus | 20 | 0.3 | 0.0 | ○ |
| 2 | Structure (TAC2/stretched PVA/α) | TAC3: KC-4FR manufactured by Konica Minolta | 40 | 0.8 | 1,800 | Minus | 30 | −0.3 | −0.4 | ○ |
| 3 | Structure (TAC2/stretched PVA/α) | Norbornene-based (Zeonor Film Δnd = 65 nm, manufactured by ZEON CORPORATION) | 70 | 0.4 | 1,200 | Minus | 40 | −0.3 | −0.2 | ○ |
| 4 | Structure (TAC2/stretched PVA/α) | Norbornene-based (Arton (note 1) manufactured by JSR Corporation) | 50 | 1.0 | 1,000 | Minus | 50 | −0.4 | −0.5 | ○ |
| 5 | Structure (TAC2/stretched PVA/α) | Acrylic 1 (resin disclosed in Example 1 of JP-A No. 2000-230016) | 30 | 0.6 | 1,500 | Minus | 55 | −0.3 | −0.5 | ○ |
| 6 | Structure (TAC2/stretched PVA) | Absent (two-layer structure) | — | — | — | Minus | 80 | −0.7 | −0.8 | ○ |
| 7 | Structure (TAC1/stretched PVA) | Absent (two-layer structure) | — | — | — | Minus | 120 | −1.5 | −2.1 | ○ |
| Comparative example 1 | Structure (TAC2/stretched PVA/α) | TAC2: TD-80UL manufactured by Fujifilm Corporation | 80 | 0.1 | 1,500 | Zero | 0 | x | x | Δ |
| Comparative example 2 | Structure (TAC2/stretched PVA/α) | TAC4: WVBZ Film manufactured by Fujifilm Corporation | 80 | — | 2,000 | Plus | 20 | x | x | x |

(Note 1)
Arton is a product obtained by stretching an Arton film to 1.5 times in the film-feed direction at a temperature of 155° C. or less. The release film is provided on the α-film or the stretched PVA with an adhesive interposed therebetween. The surface protecting film is provided on TAC2 or TAC1 with an adhesive interposed therebetween.
(Note 2)
When the sheet material curls so that the release film is facing inward, the MD curling state is indicated as "minus." When the sheet material curls so that the release film is facing outward, the MD curling state is indicated as "plus."

TABLE 3

| EXAMPLES | Structure of first and second layers of optical member | Structure of α-film third layer of optical member | Thickness of α-film (μm) | Dimensional change rate of α-film (%, 70° C.) MD | Elastic modulus of α-film (MPa) MD | MD curling state of sheet material (note 2) | Amount of MD curing of sheet material (mm) | Bonding accuracy (mm) P1 | Bonding accuracy (mm) P2 | Peeling on roll |
|---|---|---|---|---|---|---|---|---|---|---|
| 8 | Structure (PET/stretched PVA) | Absent (two-layer structure) | — | — | — | Minus | 120 | −1.7 | −2.0 | ○ |
| 9 | Structure (PET/stretched PVA/α) | TAC1: KC4UY manufactured by Konica Minolta | 40 | 0.2 | 2,500 | Minus | 10 | −0.1 | −0.1 | ○ |
| 10 | Structure (PET/stretched PVA/α) | TAC2: TD-80UL manufactured by Fujifilm Corporation | 80 | 0.1 | 1,500 | Minus | 20 | −0.2 | −0.4 | ○ |

TABLE 3-continued

| EXAMPLES | Structure of first and second layers of optical member | Structure of α-film third layer of optical member | Thickness of α-film (μm) | Dimensional change rate of α-film (%, 70° C.) MD | Elastic modulus of α-film (MPa) MD | MD curling state of sheet material (note 2) | Amount of MD curing of sheet material (mm) | Bonding accuracy (mm) P1 | Bonding accuracy (mm) P2 | Peeling on roll |
|---|---|---|---|---|---|---|---|---|---|---|
| 11 | Structure (PET/ stretched PVA/α) | TAC3: KC-4FR manufactured by Konica Minolta | 40 | 0.8 | 1,800 | Minus | 10 | −0.2 | −0.2 | ○ |
| 12 | Structure (PET/ stretched PVA/α) | TAC4: WVBZ Film manufactured by Fujifilm Corporation | 80 | — | 2,000 | Minus | 20 | −0.3 | −0.5 | ○ |
| 13 | Structure (PET/ stretched PVA/α) | Norbornene-based (Zeonor Film Δnd = 65 nm, manufactured by ZEON CORPORATION) | 70 | 0.4 | 1,200 | Minus | 15 | −0.1 | −0.3 | ○ |
| 14 | Structure (PET/ stretched PVA/α) | Norbornene-based (Arton (note 1) manufactured by JSR Corporation) | 50 | 1.0 | 1,000 | Minus | 10 | 0.0 | −0.2 | ○ |
| 15 | Structure (PET/ stretched PVA/α) | Biaxially-stretched PP | 20 | — | 1,900 | Minus | 20 | −0.3 | −0.1 | ○ |
| 16 | Structure (PET/ stretched PVA/α) | Acrylic 1 (resin disclosed in Example 1 of JP-A No. 2000-230016) | 30 | 0.6 | 1,500 | Minus | 15 | 0.0 | −0.2 | ○ |

(Note 1)
Arton is a product obtained by stretching an Arton film to 1.5 times in the film-feed direction at a temperature of 155° C. or less. The release film is provided on the α-film or the stretched PVA with an adhesive interposed therebetween. The surface protecting film is provided on PET or TAC1 with an adhesive interposed therebetween. PET used was T100 (38 μm in thickness) manufactured by Mitsubishi Polyester Film Inc.
(Note 2)
When the sheet material curls so that the release film is facing inward, the MD curling state is indicated as "minus." When the sheet material curls so that the release film is facing outward, the MD curling state is indicated as "plus."

The results of Tables 2 and 3 show that the sheet materials of Examples 1 to 16 each curls in its longitudinal direction so that the release film is facing inward (minus curling) and that peeling was not observed on the roll in each of the sheet materials of Examples 1 to 16. When the sheet material having the structure shown in Table 2 or 3 has a curling amount of 5 mm to 100 mm, the bonding accuracy is also good. In Comparative Examples 1 and 2, however, peeling was observed on the roll, and a bonding failure occurred.

The invention claimed is:

1. A material roll comprising a roll of a continuous sheet material, comprising:
an optical member comprising a polarizer; and
a release film provided on one side of the optical member with an adhesive interposed therebetween, and
a surface protecting member provided on another side of the optical member; wherein
the optical member is constructed of materials that cause the continuous sheet material to curl in the longitudinal direction of the continuous sheet material when no external force is applied in such a way that the release film is facing inward, and
the continuous sheet material is for use in a process comprising half cutting and bonding the optical member to a substrate with the adhesive interposed therebetween to form an optical display unit;
wherein the half cutting is a process comprising cutting the member of the continuous sheet material while leaving the release film or the surface protecting member uncut or a process comprising bonding a carrier film to the continuous sheet material and cutting the continuous sheet material while leaving the carrier film uncut;
wherein the material roll is wound so that the release film is placed facing inward from a center core of the roll and the optical member is placed facing outward from the center core of the roll;
wherein a cut sample of the sheet material has a curling amount of 5 mm to 100 mm, when it is placed on a flat surface so that it can curl to become convex downwardly, wherein the sample is obtained by cutting the sheet material in a length of 29.7 cm parallel to the longitudinal direction and in a width of 21.0 cm perpendicular to the longitudinal direction, and the curling amount is the height of an edge of the sample from the flat surface.

2. The material roll of claim 1, wherein the optical member comprises a first film provided on one side of the polarizer, a second film provided on another side of the polarizer, and an adhesive provided on the second film, wherein
the release film is provided on the second film with the adhesive interposed therebetween, and
the longitudinal dimensional change rate of the first film is lower than the longitudinal dimensional change rate of the second film.

* * * * *